United States Patent
Yuzurihara et al.

(10) Patent No.: US 10,594,220 B2
(45) Date of Patent: Mar. 17, 2020

(54) POWER SUPPLY DEVICE AND METHOD FOR CONTROLLING POWER SUPPLY DEVICE

(71) Applicant: KYOSAN ELECTRIC MFG. CO., LTD., Yokohama-shi, Kanagawa (JP)

(72) Inventors: Itsuo Yuzurihara, Yokohama (JP); Takeshi Fujiwara, Yokohama (JP); Ryosuke Ohma, Yokohama (JP); Hiroshi Kunitama, Yokohama (JP); Satoshi Kawai, Yokohama (JP); Ryota Suzuki, Yokohama (JP)

(73) Assignee: KYOSAN ELECTRIC MFG. CO., LTD., Yokohama-shi (JP)

( * ) Notice: Subject to any disclaimer, the term of this patent is extended or adjusted under 35 U.S.C. 154(b) by 0 days.

(21) Appl. No.: 16/473,770

(22) PCT Filed: Feb. 23, 2017

(86) PCT No.: PCT/JP2017/006756
§ 371 (c)(1),
(2) Date: Jun. 26, 2019

(87) PCT Pub. No.: WO2018/123083
PCT Pub. Date: Jul. 5, 2018

(65) Prior Publication Data
US 2019/0341851 A1 Nov. 7, 2019

(30) Foreign Application Priority Data
Dec. 26, 2016 (JP) .................. 2016-250914

(51) Int. Cl.
*H02M 3/335* (2006.01)
*H02M 3/158* (2006.01)
*H02M 3/42* (2006.01)

(52) U.S. Cl.
CPC ........... *H02M 3/1584* (2013.01); *H02M 3/42* (2013.01)

(58) Field of Classification Search
CPC ..... H02M 3/1584; H02M 3/42; H02M 3/1558
(Continued)

(56) References Cited

U.S. PATENT DOCUMENTS 3,588,664 A * 6/1971 Akamatsu ........... H02M 3/1584
363/124
4,694,386 A * 9/1987 De Sartre ............... H02M 1/36
323/901

(Continued)

FOREIGN PATENT DOCUMENTS

JP 9-215322 A 8/1997
JP 2000-173794 A 6/2000
(Continued)

OTHER PUBLICATIONS

International Search Report dated Apr. 11, 2017, issued in counterpart application No. PCT/JP2017/006756, w/English translation (5 pages).
Written Opinion dated Apr. 11, 2017, issued in counterpart application No. PCT/JP2017/006756, w/English translation (7 pages).

*Primary Examiner* — Rajnikant B Patel
(74) *Attorney, Agent, or Firm* — Westerman, Hattori, Daniels & Adrian, LLP

(57) ABSTRACT

A chopper section of a power supply device includes a plurality of step-down chopper circuits, and multiphase control of the step-down chopper circuits is performed using gate signals having phases displaced from each other. This shortens the period with which output signals of the step-down chopper circuits are changed. Shortening the period reduces the amount of jitter resulting from a gap between the occurrence of a command signal and a sampling point that is a point in time at which a gate signal is generated. The (Continued)

number of phases of the gate signals equals the number of phases of the step-down chopper circuits. The control of the gate signal generator is asynchronous to feedback control by the controller. Points in time (sampling points) at which gate signals are generated are points in time of generation (sampling points) after a point in time at which the controller calculates a manipulated value.

7 Claims, 15 Drawing Sheets

(58) Field of Classification Search
USPC ............... 323/222, 224, 271–276, 282–288;
363/16, 17, 21, 2, 21.05, 21.12, 21.14,
363/21.17, 34–40, 71, 89
See application file for complete search history.

(56) References Cited

U.S. PATENT DOCUMENTS

| | | | | |
|---|---|---|---|---|
| 5,929,692 A * | 7/1999 | Carsten | ................... | H02M 1/15 |
| | | | | 323/271 |
| 8,963,521 B2 * | 2/2015 | Wei | ........................... | G05F 1/46 |
| | | | | 323/272 |
| 2016/0254799 A1* | 9/2016 | Kim | ........................ | H03J 5/244 |
| | | | | 327/559 |

FOREIGN PATENT DOCUMENTS

| | | |
|---|---|---|
| JP | 2008-289317 A | 11/2008 |
| JP | 2012-29487 A | 2/2012 |
| JP | 2012-161222 A | 8/2012 |

* cited by examiner (a) Vref IS CHANGED IMMEDIATELY BEFORE SAMPLING POINT kA (b) Vref IS CHANGED IMMEDIATELY AFTER SAMPLING POINT kA (c) JITTER ON OUTPUT VOLTAGE

JITTER IN TWO-PHASE INTERLEAVE CHOPPER

FIG.14 PWM CONTROL STEP-DOWN CHOPPER

POWER SUPPLY DEVICE AND METHOD FOR CONTROLLING POWER SUPPLY DEVICE

TECHNICAL FIELD

The invention of the present application relates to a power supply device and a method for controlling the power supply device.

BACKGROUND ART

Power supply devices that step the input voltage up or down to a predetermined voltage by the switching operation of a semiconductor switching element included in a chopper circuit and output the resultant voltage are known. Parallel multiplex chopper devices, which include two or more such chopper circuits connected in parallel, are known. The times at which switching elements of the respective chopper circuits are turned on and off are staggered.

In such a parallel multiplex chopper device, resonance suppression control is performed to suppress LC resonance between a reactor and a capacitive load of the chopper device, but a current detection delay decreases the current response speed. This makes the resonance suppression control difficult.

Meanwhile, the output voltage by switching operation has a pulsed waveform, and the detected current waveform includes current ripples.

To reduce the influence of such current ripples of the detected current waveform, the output current is detected by sampling, and the current control cycle is synchronized with a PWM carrier signal. However, in the case where the current is detected in synchronization with the PWM carrier signal, the current detection is delayed by at least an amount corresponding to one cycle of the PWM carrier signal. The current detection delay decreases the current response speed, and this makes the resonance suppression control difficult.

A parallel multiplex chopper device has been proposed which, to reduce the influence of such current ripples, performs current control using a moving average of sampled values of the output current of each chopper circuit as detected current, and compares a command voltage calculated in the current control and a PWM carrier signal of the chopper circuit, the PWM carrier signal having a phase difference corresponding to a value obtained by dividing 360 degrees by the number of chopper circuits, to output a gate command, thus synchronizing the sampling interval with the PWM carrier signal (see Literature 1).

PRIOR ART LITERATURE

Patent Literature

[Patent literature 1] Japanese Patent Application Laid-Open No. 2012-161222

SUMMARY OF THE INVENTION

Problems to be Solved by the Invention

FIG. 14 is a diagram for explaining the circuit configuration of a chopper circuit using a pulse width modulator (PWM control). The chopper circuit illustrated in FIG. 14 has a circuit configuration of a single-phase chopper, and controls the turning on/off of switching elements S1 and S2 using gate signals (Gate1 and Gate2) to perform PWM control. With regard to gate signals, generally, a triangle waveform (Triangle or Sawtooth) and a manipulated value (MV) are compared by a comparator to generate the gate signals (Gate1 and Gate2).

The manipulated value (MV) is formed based on the difference between a command signal (Vref) and a feedback output signal (output voltage Vout, inductance current iL, or capacitor current iC) in a main circuit (Controller) of a control circuit including the chopper circuit. In PWM control using a fixed switching frequency, the comparator generates the gate signals (Gate1 and Gate2) based on the manipulated value generated by feedback control by the main circuit. The generation of the manipulated value and the generation of the gate signals are performed with a predetermined period. A gate signal is generated at each point (hereinafter referred to as a sampling point) in time of the generation thereof. Accordingly, the next gate signal is generated based on a manipulated value calculated at the next sampling point at that time. Thus, in fixed PWM control, the duty cycle of a gate signal is fixed in a segment between adjacent sampling points.

In fixed PWM control, while sampling points at which gate signals are generated are fixed, the timing of generation of the manipulated value by the main circuit varies depending on the point in time at which the command signal is changed. Accordingly, in variable voltage control using pulse width modulation (PWM) control by the chopper circuit, the timing of generation of the command signal varies. If the point in time shifts to a point in time before or after a sampling point, which is the point in time of generation by a gate signal generation circuit, a phase shift (hereinafter referred to as jitter) of one period occurs at a rising edge of a gate signal generated in the gate signal generator.

FIG. 15 is a diagram for explaining jitter occurring in a single-phase chopper circuit, and illustrates an example of a timing diagram for the case where a step-down chopper that performs general single-phase PWM control performs High/Low pulsed operation.

FIGS. 15(a) and 15(b) illustrate a command voltage Vref, an output voltage Vout, a triangle waveform signal (triangle) as a carrier signal, a manipulated value (MV), gate signals (Gate1 and Gate2), and an inductance current iL. FIG. 15(c) illustrates the command voltage Vref, the output voltage Vout, the triangle waveform signal (triangle) as the carrier signal, the manipulated value (MV), and the inductance current iL.

FIG. 15(a) illustrates a state in which the command signal (command voltage Vref) is changed immediately before sampling point k. In this case, for example, the command voltage (Vref) changes from a Low state to a High state before sampling point k, and then the manipulated value MV is immediately updated at sampling point k. Accordingly, the duty cycles of the gate signals (Gate1 and Gate2) are updated in a segment between sampling point k and the next sampling point (k+1).

On the other hand, FIG. 15(b) illustrates a state in which the command signal (command voltage Vref) is changed immediately after sampling point k. In this case, the command voltage (Vref) changes from a Low state to a High state after sampling point k, and then the manipulated value MV is updated at the next sampling point (k+1). Accordingly, the duty cycles of the gate signals (Gate1 and Gate2) are updated in a segment between the sampling point (k+1) delayed by one period and the next sampling point (k+2). Thus, if the command voltage (Vref) suddenly changes from a Low state to a High state or from a High state to a Low state, the changes of the duty cycles are delayed in phase by one period at most.

FIG. 15(c) illustrates the two states illustrated in FIGS. 15(a) and (b) together, and illustrates jitter having a width of one period on the output voltage Vout.

Such a phase delay in duty cycle change affects the control of the output voltage, and appears as a phase delay in the output voltage. Thus, a phase delay of up to one period leads to jitter at a rising edge and a falling edge of the output voltage in variable output voltage control (High/Low pulse).

This jitter constitutes a problem of plasma quality (reproducibility) in semiconductor manufacturing apparatuses and the like. Conventionally, to improve the responsiveness of control, switching frequency has been increased. However, since speeding up by increasing frequency is restricted by the speeds of switching elements or a loss tolerance, increasing frequency has a limitation.

Moreover, a prior-art power supply device has been proposed which has the following configuration: only the main circuit has a three-phase interleave configuration, and the timing of update of a manipulated value and sampling points of generation of gate signals are the same as those of a single-phase chopper. However, such a power supply device also has jitter with a width of up to one period.

Patent Literature 1 describes that the parallel multiplex chopper device reduces a delay in current detection using a moving average by synchronizing the timing of detection of the output signal with the PWM carrier signal from which gate signals are generated, and gate signals are generated such that PWM carrier signals of the respective chopper circuits are staggered by a phase difference of a value obtained by dividing 360 degrees by the number of chopper circuits.

However, the parallel multiplex chopper device disclosed in Patent Literature 1 synchronizes the detection of the output signal and peak values of the PWM signal, and performs control using a command signal (current command) at a point in time at a peak value of the PWM signal. Accordingly, the timing of occurrence of the command signal necessarily coincides with a sampling point that is a point in time at which gate signals are generated. Since the timing of the command signal and that of the gate signal necessarily coincide in the configuration disclosed in Patent Literature 1, jitter at rising edges of the gate signals does not occur. Also, there is no suggestion about jitter.

An object of the present invention is to solve the above-described prior-art problem and reduce the amount of jitter resulting from a gap between the occurrence of a command signal and a sampling point that is a point in time at which a gate signal is generated in a power supply device including a chopper circuit.

Means to Solve the Problems

In the present invention, a chopper section of a power supply device includes a plurality of step-down chopper circuits connected in parallel, and multiphase control of the step-down chopper circuits is performed using gate signals having phases displaced from each other. This shortens the period with which output signals of the step-down chopper circuits are changed. Shortening the period reduces the amount of jitter resulting from a gap between the occurrence of a command signal and a sampling point that is a point in time at which a gate signal is generated.

The present invention includes an aspect as a power supply device and an aspect as a method for controlling a power supply device.

(Aspect as Power Supply Device)

A power supply device of the present invention is a power supply device having variable output voltage, and includes (a) a multiphase chopper section including step-down chopper circuits of a plurality of phases connected in parallel, (b) a controller for calculating a manipulated value for controlling the chopper section from a feedback signal outputted from the chopper section and a command signal, and (c) a gate signal generator for generating gate signals for performing multiphase control of turning on/off of switching elements included in the step-down chopper circuits of the respective phases based on the manipulated value in phases displaced from each other.

The gate signals and the gate signal generator have the following features:

(d) the number of phases of the gate signals equals the number of phases of the step-down chopper circuits;

(e) in the gate signal generator, (e1) gate signals are generated with the same sampling period for the respective phases by sampling synchronous with generation of the gate signals and asynchronous to the command signal; and (e2) sampling points at which the gate signals are generated are sampling points after a point in time at which the controller calculates the manipulated value.

In the power supply device of the present invention, the period with which the output signal of the chopper section is changed is reduced in multiphase control by making the number of phases of the gate signals equal to the number of phases of the step-down chopper circuits. By making the period of changing the output signal of the chopper section shorter than the periods of changing output signals of the respective step-down chopper circuits in single-phase control and multiphase control, even if there is a gap between the occurrence of the command signal and a sampling point at which a gate signal is generated, the amount of jitter resulting from the gap can be limited to up to the shortened changing period.

The gate signal generator includes a pulse width modulator and a phase adjuster.

The phase adjuster performs phase adjustment in which phases of the gate signals of the respective phases are staggered by a phase difference obtained by dividing the sampling period by the number of phases. The pulse width modulator generates gate signals having pulse widths according to the manipulated value for the respective phases.

In multiphase control of the plurality of step-down chopper circuits according to the present invention, the step-down chopper circuits need to be controlled in a plurality of phases displaced from each other. Accordingly, the pulse width modulator generates gate signals having pulse widths according to the manipulated value for the respective phases, and the phase adjuster staggers the phases of the gate signals of the respective phases by a phase difference obtained by dividing the sampling period by the number of phases. Further, in the generation of the gate signals by the pulse width modulator, to match the phase of the gate signal generated by the manipulated value of each phase, the phase shifter shifts the manipulated value by an amount corresponding to the phase difference of the gate signal.

The gate signal generator may have a plurality of embodiments.

First Embodiment of Gate Signal Generator

A first embodiment of the gate signal generator has a configuration in which the pulse width modulator generates the gate signals of the respective phases having the pulse widths according to the manipulated value using carrier signals of the respective phases phase-adjusted by the phase adjuster. The first embodiment of the gate signal generator includes, in addition to the phase adjuster and the pulse width modulator, a phase shifter for phase-shifting the manipulated value by a phase difference obtained by dividing the sampling period by the number of phases for each phase in order.

The phase adjuster generates carrier signals for the respective phases with phases displaced from each other by a phase difference obtained by dividing the sampling period by the number of phases. The pulse width modulator generates the gate signals based on amplitude comparison between the manipulated value and the carrier signals of the respective phases.

Second Embodiment of Gate Signal Generator

A second embodiment of the gate signal generator has a configuration in which the phase adjuster adjusts phases of the gate signals of the respective phases having the pulse widths according to the manipulated value generated by the pulse width modulator.

The pulse width modulator generates gate signals of the respective phases based on comparison between the manipulated values of the respective phases and the same carrier signal. The phase adjuster staggers the phases of the gate signals of the respective phases generated by the pulse width modulator by a phase difference obtained by dividing the sampling period by the number of phases.

(Aspect as Method for Controlling Power Supply Device)

A method for controlling the power supply device of the present invention is a method for controlling a power supply device, the method capable of changing output voltage by feedback control of a multiphase chopper section including step-down chopper circuits of two or more phases, which are connected in parallel. The method includes a gate signal generation step for generating gate signals for controlling turning on/off of switching elements included in the step-down chopper circuits of the respective phases based on a manipulated value of the feedback control by sampling performed with the same sampling period for the respective phases.

The gate signal generation step includes the following steps:
(a) a pulse width modulation step for generating gate signals having pulse widths according to the manipulated value for the respective phases; and
(b) a phase adjustment step for performing phase adjustment in which phases of the gate signals of the respective phases are staggered by a phase difference obtained by dividing the sampling period by the number of phases.
(c) The sampling is synchronous with generation of the gate signals and asynchronous to the command signal.

In the method for controlling the power supply device of the present invention, the period with which the output signal of the chopper section is changed is reduced in multiphase control by making the number of phases of the gate signals equal to the number of phases of the step-down chopper circuits. By making the period of changing the output signal of the chopper section shorter than the periods of changing output signals of the respective step-down chopper circuits in single-phase control and multiphase control, even if there is a gap between the occurrence of the command signal and a sampling point at which a gate signal is generated, the amount of jitter resulting from the gap can be limited to up to the shortened changing period.

The gate signal generation step includes a pulse width modulation step and phase adjustment step. The pulse width modulation step generates gate signals having pulse widths according to the manipulated value for the respective phases. The phase adjustment step performs phase adjustment in which phases of the gate signals of the respective phases are staggered by a phase difference obtained by dividing the sampling period by the number of phases.

In the method for controlling the power supply device of the present invention, in multiphase control of the plurality of step-down chopper circuits, the step-down chopper circuits need to be controlled in a plurality of phases displaced from each other. Accordingly, the pulse width modulation step generates gate signals having pulse widths according to the manipulated value for the respective phases, and the phase adjustment step staggers the phases of the gate signals of the respective phases by a phase difference obtained by dividing the sampling period by the number of phases. Further, in the generation of the gate signals by the pulse width modulation step, to match the manipulated value and the phase of the generated gate signal of each phase, the phase shift step shifts the manipulated value by an amount corresponding to the phase difference of the gate signal.

The gate signal generation step may have a plurality of embodiments.

First Embodiment of Gate Signal Generation Step

A first embodiment of the gate signal generation step includes, in addition to the pulse width modulation step and the phase adjustment step, a phase shift step.

The gate signals of the respective phases having the pulse widths according to the manipulated value by the pulse width modulation step are generated using carrier signals of the respective phases phase-adjusted in the phase adjustment step. The phase shift step phase-shifts the manipulated value to match the phase of the manipulated value with the phase of the carrier signal of each phase.

The phase shift step phase-shifts the manipulated value by a phase difference obtained by dividing the sampling period by the number of phases for each phase in order. The phase adjustment step generates carrier signals for the respective phases with phases displaced from each other by a phase difference obtained by dividing the sampling period by the number of phases. The pulse width modulation step generates the gate signals based on amplitude comparison between the manipulated value and the carrier signals of the respective phases.

Second Embodiment of Gate Signal Generation Step

A second embodiment of the gate signal generation step adjusts, by the phase adjustment step, phases of the gate signals of the respective phases having the pulse widths according to the manipulated value generated by the pulse width modulation step.

The pulse width modulation step generates the gate signals by comparing the manipulated values and the carrier signal. The phase adjustment step staggers the phases of the gate signals generated in the pulse width modulation step by a phase difference obtained by dividing the sampling period by the number of phases, thus generating the gate signals of the respective phases.

According to the embodiments of the present invention, in a power supply device including a plurality of step-down chopper circuits, the amount of jitter resulting from a gap between the occurrence of a command signal and a sampling point that is a point in time at which a gate signal is generated can be reduced.

DETAILED DESCRIPTION OF THE EMBODIMENTS

A power supply device of the present invention and a method for controlling the power supply device will be described with reference to FIGS. 1 to 13. Hereinafter, a schematic configuration example of the power supply device of the present invention will be described with reference to FIG. 1, a first configuration example of the power supply device of the present invention and a first embodiment of the control method will be described with reference to FIGS. 2 to 10, and a second configuration example of the power supply device of the present invention and a second embodiment of the control method will be described with reference to FIGS. 11 to 13.

[Schematic Configuration of Power Supply Device of the Present Invention]

Figure 1:
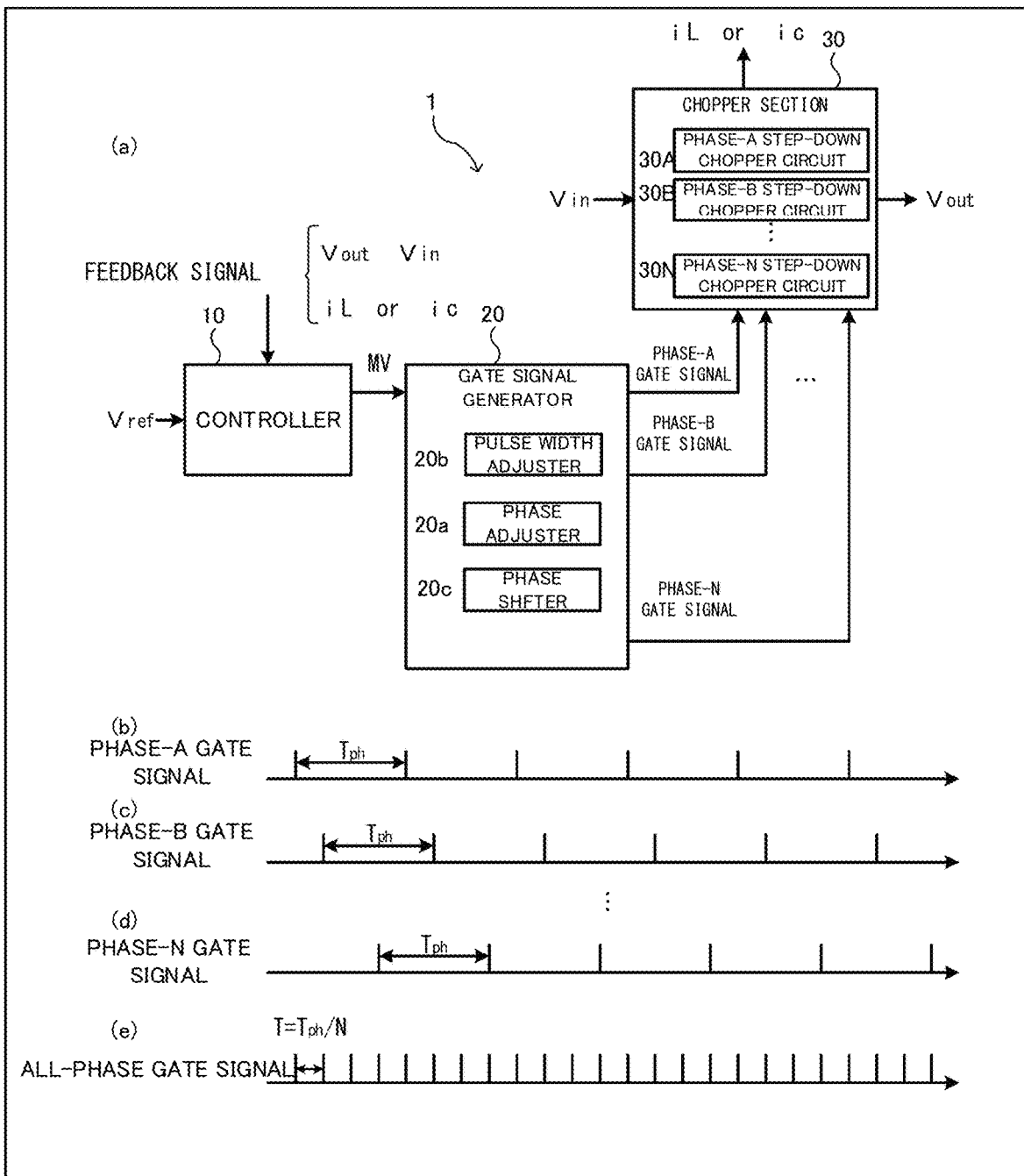
FIG. 1 is a diagram for explaining a schematic configuration example of a power supply device of the present invention.

FIG. 1 is a diagram for explaining a schematic configuration example of the power supply device of the present invention.

A power supply device 1 includes a chopper section 30 that controls an input voltage Vin and outputs an output voltage Vout, a controller 10 that performs voltage control for the chopper section 30, and a gate signal generator 20 that generates gate signals of two or more phases for controlling the chopper section 30 based on a manipulated value MV controlled by the controller 10.

The chopper section 30 includes step-down chopper circuits 30A to 30N connected in parallel, and performs multiphase control in which the step-down chopper circuits 30A to 30N are driven in the respective phases.

An output of the chopper section 30 is fed back to the controller 10. The controller 10 compares the feedback signal and a command voltage Vref to perform voltage control, and calculates the manipulated value MV for controlling the chopper section 30. The feedback signal may be, for example, the output voltage Vout, the input voltage Vin, inductance current iL flowing through inductances included in the step-down chopper circuits, or capacitor current iC flowing through capacitances included in the step-down chopper circuits.

Based on the manipulated value MV calculated by the controller 10, the gate signal generator 20 generates gate signals for performing multiphase control of the turning on/off of switching elements (not illustrated in FIG. 1) included in the step-down chopper circuits 30A to 30N of the respective phases. The gate signals are gate signals (phase-A gate signal, phase-B gate signal, . . . , and phase-N gate signal) of the two or more phases displaced from each other, and are generated in the respective phases with the same sampling period. Accordingly, the gate signals of the respective phases have the same intervals between gate signals, and the gate signals of the respective phases have phase shifts therebetween. The number of phases of the gate signals of the gate signal generator 20 equals the number N of phases of the step-down chopper circuits 30A to 30N. It should be noted that in this example, N phase is described, where N (integer greater than or equal to two) is the number of phases of the two or more phases.

In the gate signal generator 20, sampling is synchronous with the generation of the gate signals but not synchronous with a command signal. Meanwhile, in the main control of the controller 10, feedback control is performed based on the command signal and the feedback signal to find the manipulated value MV. Accordingly, sampling is synchronous with the generation of the gate signals but not synchronous with the command signal. Thus, the calculation timing of the manipulated value MV calculated by the controller 10 does not necessarily coincide with the generation timing of the gate signals generated by the gate signal generator 20.

The gate signal generator 20 of the present invention performs sampling using a sampling point that is a point in time at which a gate signal is generated, as a sampling point appearing after a point in time at which the controller 10 calculates the manipulated value MV, thus generating a gate signal. In the following explanation, the points in time at which the gate signals are generated are referred to as sampling points.

A displacement corresponding to one period between adjacent sampling points occurs between the point in time at which the manipulated value MV is calculated and a sampling point at the point in time of the next sampling point, at sampling points of the two or more phases at most.

The gate signal generator 20 includes a pulse width modulator 20b that generates gate signals having a pulse width according to the manipulated value MV for the respective phases, and a phase adjuster 20a that performs phase adjustment in which the phases of the gate signals of the respective phases are staggered by a phase difference obtained by dividing the sampling period by the number of phases.

The phase adjuster 20a adjusts the phases of the gate signals of the respective phases to reduce the gap between the gate signals of adjacent phases out of the two or more phases to a period corresponding to the phase difference obtained by dividing the sampling period by the number of phases. This reduces the amount of the gap between adjacent sampling points and reduces the amount of jitter, which is a gap in time between rising edges of the output voltage.

FIG. 1(b) to FIG. 1(d) illustrate examples of a phase-A gate signal, a phase-B gate signal, and a phase-N gate signal. FIG. 1(e) illustrates an example of a gate signal of the two or more phases obtained by superimposing all the phases, phase A to phase N.

The period Tph between signals is common to the phase-A gate signal, the phase-B gate signal, and the phase-N gate signal, the phases of which are staggered by T (=Tph/N) obtained by dividing the period Tph by the number N of phases. Thus, the period T of the gate signal of the two or more phases obtained by superimposing these phases is 1/N of the period Tph of each phase.

The gate signal generator 20 includes a phase shifter 20c, and phase-shifts the manipulated value MV, which is calculated by the controller 10, by a phase difference obtained by dividing the sampling period by the number of phases for each phase in order. Shifting the manipulated value MV by the phase shifter 20c makes it possible to match the phase of the manipulated value and the phases of the generated gate signals of the respective phases in the generation of the gate signals by the pulse width modulator 20b.

Figure 2:
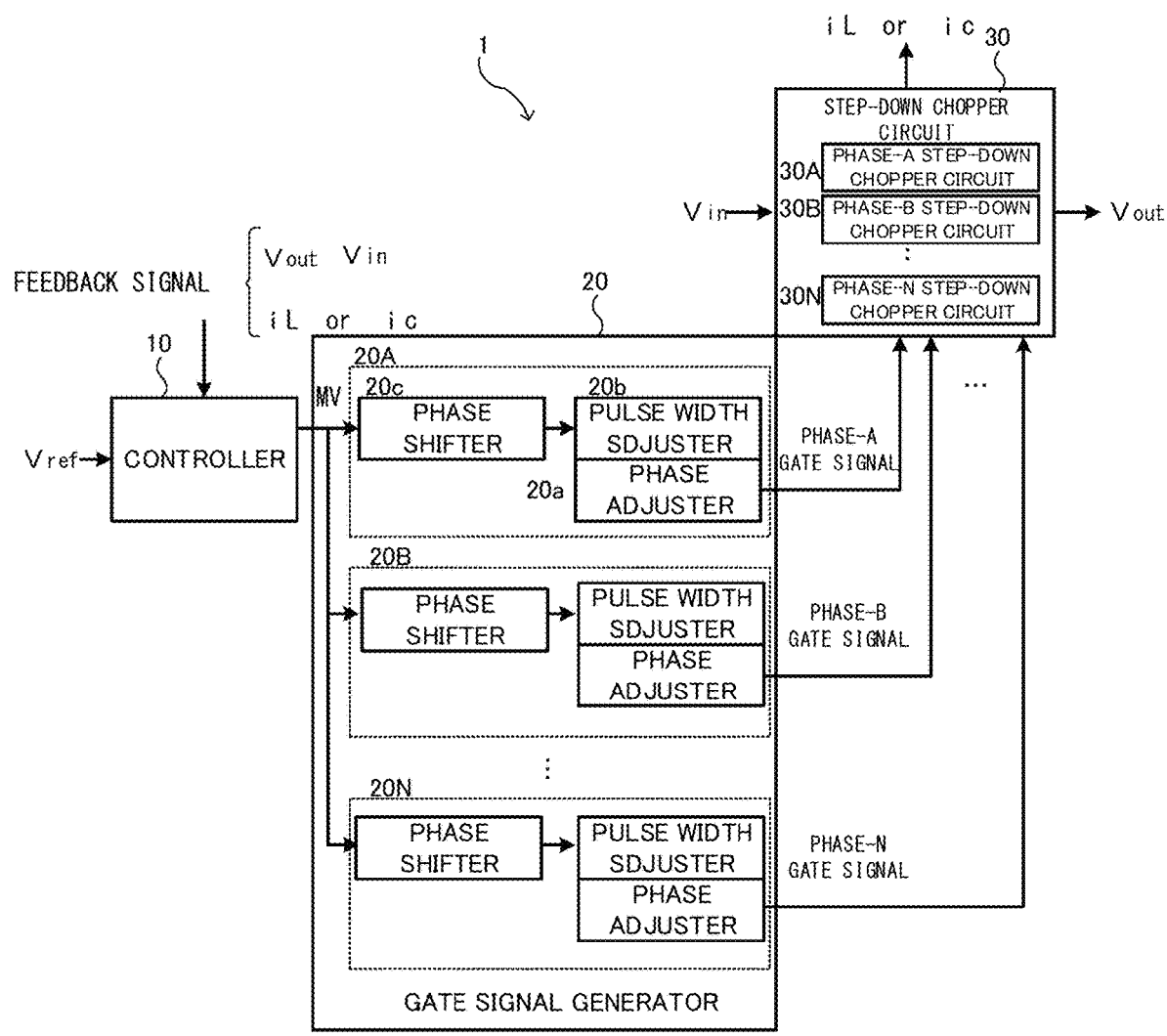
FIG. 2 is a diagram for explaining a schematic configuration example of a first power supply device of the present invention.
Figure 3:
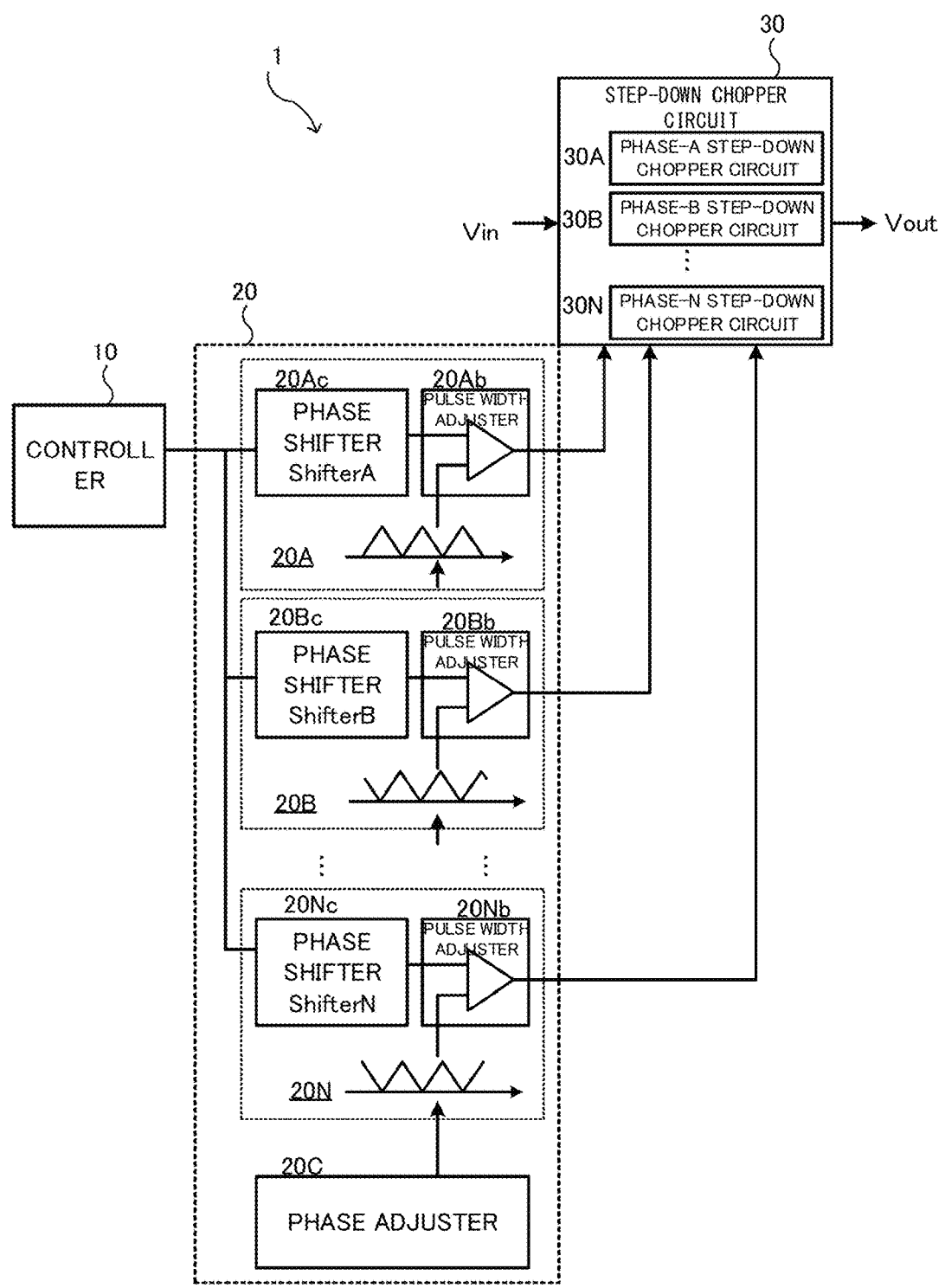
FIG. 3 is a diagram for explaining a schematic configuration example including a pulse width modulator using a carrier signal of the present invention.
Figure 4:
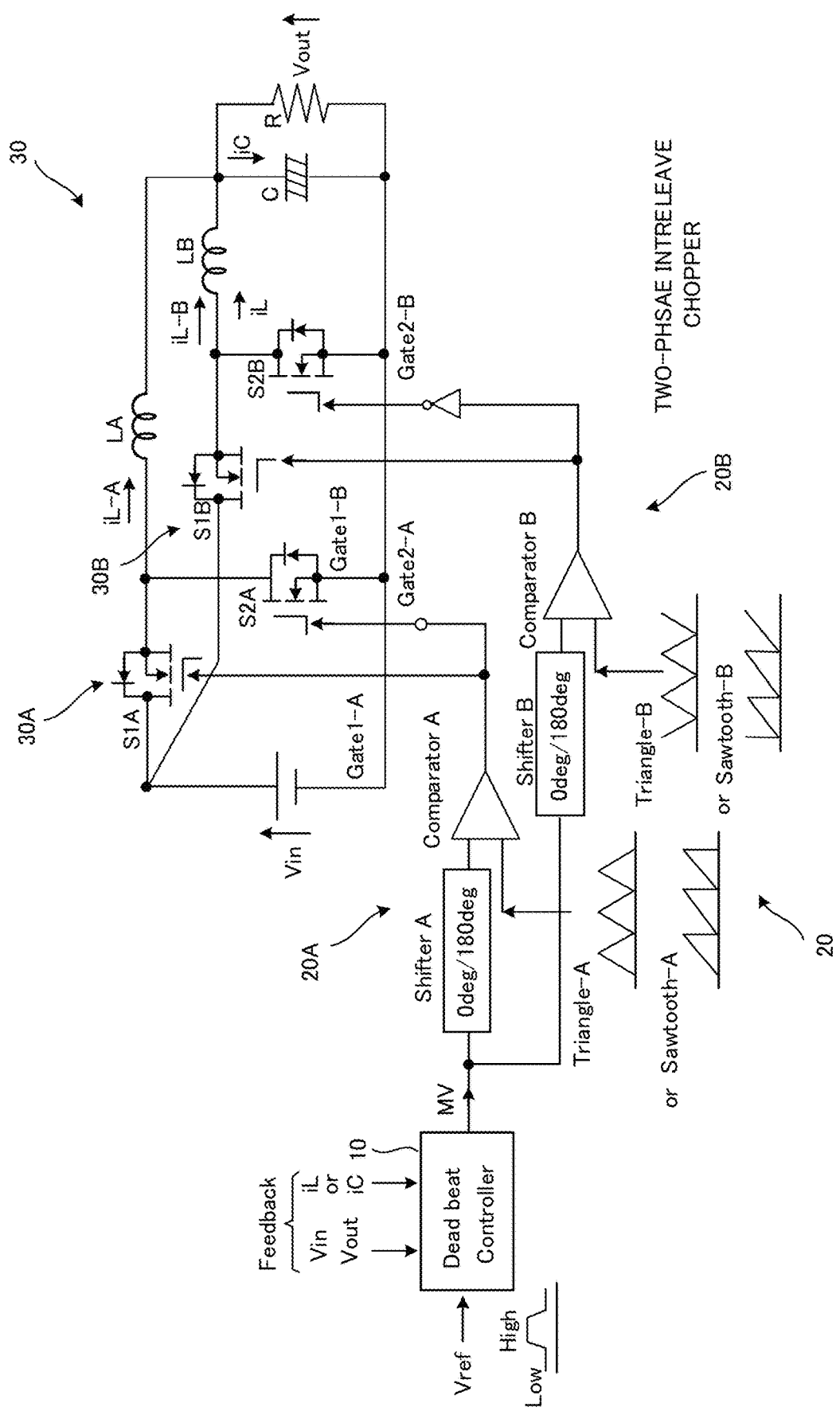
FIG. 4 is a diagram for explaining one configuration example including the pulse width modulator using the carrier signal of the present invention.

First Embodiment of Power Supply Device and Control Method of the Present Invention Next, a first embodiment of the power supply device and the control method of the present invention will be described with reference to FIGS. 2 to 10. FIG. 2 illustrates a schematic configuration example of a first power supply device. FIGS. 3 and 4 illustrate a schematic configuration example including pulse width modulators using carrier signals and one configuration example.

The schematic configuration example illustrated in FIG. 2 illustrates a configuration example of the gate signal generator 20. Other part of the configuration is common to the schematic configuration example illustrated in FIG. 1. Accordingly, an explanation about the configuration example of the gate signal generator 20 will be made here, and an explanation about other part will be omitted.

A first embodiment of the gate signal generator included in the power supply device 1 has a configuration in which using a carrier signal of each phase with the phase adjusted by the phase adjuster 20a, the pulse width modulator 20b generates a gate signal of each phase having a pulse width according to the manipulated value MV.

The gate signal generator 20 in FIG. 2 includes a phase-A gate signal generator 20A, a phase-B gate signal generator 20B, . . . , and a phase-N gate signal generator 20N, which generate multiphase gate signals (phase-A gate signal, phase-B gate signal, . . . , and phase-N gate signal) of phase A to phase N having phases displaced from each other.

The gate signal generators of the respective phases have a common configuration. Accordingly, an explanation about the phase-A gate signal generator 20A will be made, and an explanation about the gate signal generators of the other phases will be omitted.

The phase-A gate signal generator 20A includes a phase shifter 20c that receives the manipulated value MV calculated by the controller 10, a pulse width modulator 20b that receives the manipulated value MV phase-shifted by a phase difference obtained by dividing the sampling period by the number of phases in the phase shifter 20c, and a phase adjuster 20a that adjusts the phase of the carrier signal, amplitude of which is compared with that of the manipulated value MV in the pulse width modulator 20b.

The phase adjusters 20a generate carrier signals with phases displaced from each other by a phase difference obtained by dividing the sampling period by the number of phases, for the respective phases. The pulse width modulators 20b compare the amplitude of the manipulated value MV and those of the carrier signals of the respective phases with the phases adjusted by the phase adjusters 20a to generate gate signals.

The phase shifters 20c phase-shift the manipulated value by a phase difference obtained by dividing the sampling period by the number of phases for each phase in order. Accordingly, the amount of phase shift by the phase shifter 20Ac of the phase-A gate signal generator 20A, the amount of phase shift by the phase shifter 20Bc of the phase-B gate signal generator 20B, and the amount of phase shift by the phase shifter 20Nc of the phase-N gate signal generator 20N are different from each other, and the amounts of phase shift increase in order by the phase difference.

FIG. 3 illustrates an example in which a triangle waveform signal is used as a carrier signal for use in pulse width modulation in the configuration of the gate signal generator 20 illustrated in FIG. 2. In FIG. 3, an explanation about the phase-A gate signal generator 20A will be made, and an explanation about the gate signal generators of the other phases will be omitted.

In the phase-A gate signal generator 20A, the pulse width modulator 20Ab compares the amplitude of the manipulated value MV phase-shifted by the phase shifter 20Ac with that of the carrier signal having a triangle waveform to generate a gate signal. It should be noted that the triangle waveform may have any waveform shape having a linearly changing amplitude, such as a tooth wave with a waveform shape having an amplitude that linearly increases and decreases at a rising edge and a falling edge of the waveform or a waveform shape having an amplitude that rises at a rising edge of the waveform in one step and that linearly decreases at a falling edge thereof.

In the configuration illustrated in FIG. 3, the phase adjuster 20C adjusts the phases of the carrier signals to be supplied to the respective pulse width modulators 20Ab, 20Bb, . . . , and 20Nb to form phase shifts between gate signals outputted from the pulse width modulators 20Ab, 20Bb, . . . , and 20Nb.

The phase shifters 20Ac to 20Nc eliminate phase shifts from the manipulated value MV in the comparison with the carrier signals in all the pulse width modulators 20Ab to 20Nb by matching phases with the carrier signals, phases of which are compared in the pulse width modulators 20Ab to 20Nb. If the phase shifters 20Ac to 20Nc do not phase-shift the manipulated value MV, amplitude modulation is to be performed with carrier signals having phases displaced by phase adjustment, and phase displacement may occur in generated gate signals. However, since the phase shifters 20Ac to 20Nc match the phase of the manipulated value MV with the phases of the carrier signals, phase displacement of gate signals in phase adjustment can be prevented.

Embodiment for Two-Phase Control

Hereinafter, an embodiment in which two-phase control is performed will be described with reference to FIGS. 4 to 7.

FIG. 4 illustrates a circuit example of a power supply device in which two-phase control is performed by multi-phase control of chopper circuits.

The chopper section 30 includes a chopper circuit 30A of phase A and a chopper circuit 30B of phase B connected in parallel. The two chopper circuits 30A and 30B are connected to a capacitor C and a load R connected in parallel. The chopper section 30 performs two-phase control of the chopper circuits 30A and 30B in different phases, and controls the input voltage Vin to output the output voltage Vout.

The chopper circuit 30A includes a switching element S1A connected in series, a switching element S2A connected in parallel, and an inductance LA connected in series. The chopper circuit 30B includes a switching element S1B connected in series, a switching element S2B connected in parallel, and an inductance LB connected in series.

The turning on/off of the switching element S1A and the switching element S2A is controlled by a gate signal Gate1-A and a gate signal Gate2-A. Similarly, the turning on/off of the switching element S1B and the switching element S2B is controlled by a gate signal Gate1-B and a gate signal Gate2-B. It should be noted that the gate signal Gate1-A and the gate signal Gate2-A are in an inversion relation, and the gate signal Gate1-B and the gate signal Gate2-B are in an inversion relation. The switching elements, which are driven by the respective gate signals, are turned on/off in inverse phases.

The main control of the chopper section 30 is performed by the controller 10. The controller 10 performs voltage control based on the difference between a feedback signal from the chopper section 30 and the command voltage Vref to output the manipulated value MV. With regard to the voltage control, for example, a high voltage and a low voltage are alternately inputted as the command voltage Vref to perform High/Low control.

The manipulated value MV outputted from the controller 10 is inputted to the gate signal generator 20. The gate signal generator 20 includes a phase-A gate signal generator 20A and a phase-B gate signal generator 20B, which generate gate signals for driving the switching elements of the chopper circuit 30A and the chopper circuit 30B, respectively. The phase-A gate signal generator 20A includes a phase shifter (Shifter A) and a pulse width modulator (Comparator A). The phase-A gate signal generator 20A shifts the phase of the manipulated value MV by 0 or 180 degrees, and then compares the amplitude of the manipulated value MV with that of the triangle waveform (Triangle-A or Sawtooth-A) of the carrier signal to generate the gate signals (Gate1-A and Gate2-A) of phase A. The phase-B gate signal generator 20B, similar to the phase-A gate signal generator 20A, includes a phase shifter (Shifter B) and a pulse width modulator (Comparator B). The phase-B gate signal generator 20B shifts the phase of the manipulated value MV by 0 or 180 degrees, and then compares the amplitude of the manipulated value MV with that of the triangle waveform (Triangle-B or Sawtooth-B) of the carrier signal to generate the gate signals (Gate1-B and Gate2-B) of phase B.

Figure 5:
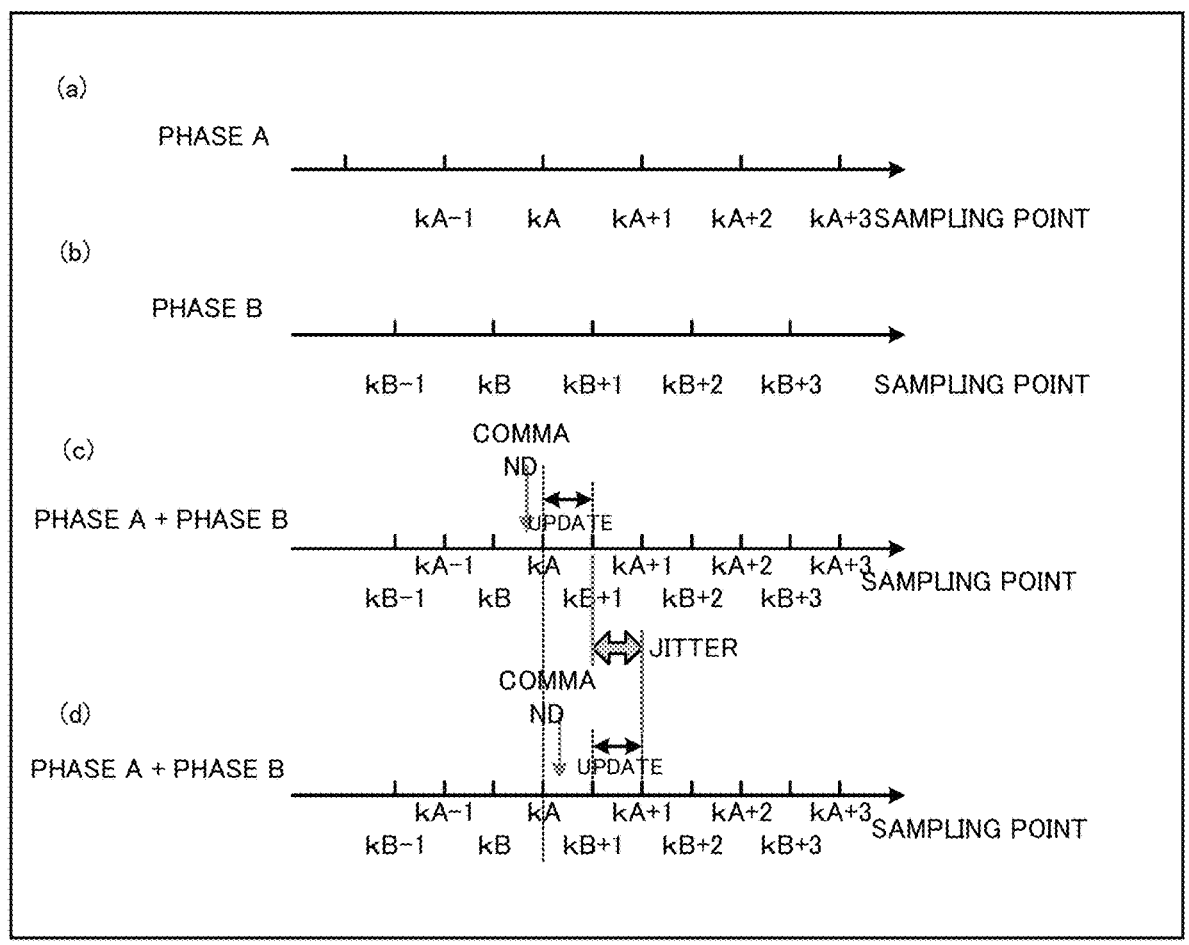
FIG. 5 is a diagram for explaining sampling points in two-phase control in a power supply device of the present invention.

FIG. 5 illustrates sampling points in two-phase control. FIG. 5(a) illustrates sampling points (kA−1, kA, kA+1, kA+2, and kA+3) of phase A, and FIG. 5(b) illustrates sampling points (kB−1, kB, kB+1, kB+2, and kB+3) of phase B. The sampling points are points in time at which gate signals are generated. The sampling points of phase A and phase B have the same period and a phase shift of π (=2π/2) therebetween.

FIG. 5(c) and FIG. 5(d) illustrate superimposed sampling points of two phases, phase A and phase B. By superimposing sampling points of two phases, the period of sampling points in two-phase control is reduced to ½ of the period of sampling points of each of phase A and phase B.

By reducing the period of sampling points to ½, the width of the time delay between the point in time at which the command signal is changed and the point in time at which the gate signal is updated can be reduced. FIG. 5(c) illustrates a state in which the command is changed before sampling point kA, and FIG. 5(d) illustrates a state in which the command is changed after sampling point kA. In the case where the command is changed before sampling point kA, the gate signal is updated between sampling point kA and sampling point kB+1. In the case where the command is changed after sampling point kA, the gate signal is updated at a point in time delayed by ½ of the period of each phase between sampling point kB+1 and sampling point kA+1. Jitter results from the times of update of the above-described two gate signals, and the time width between the times of update of the two gate signals is ½ of the single-phase period at most. Accordingly, the amount of jitter is smaller than that in single-phase control.

Figure 6:
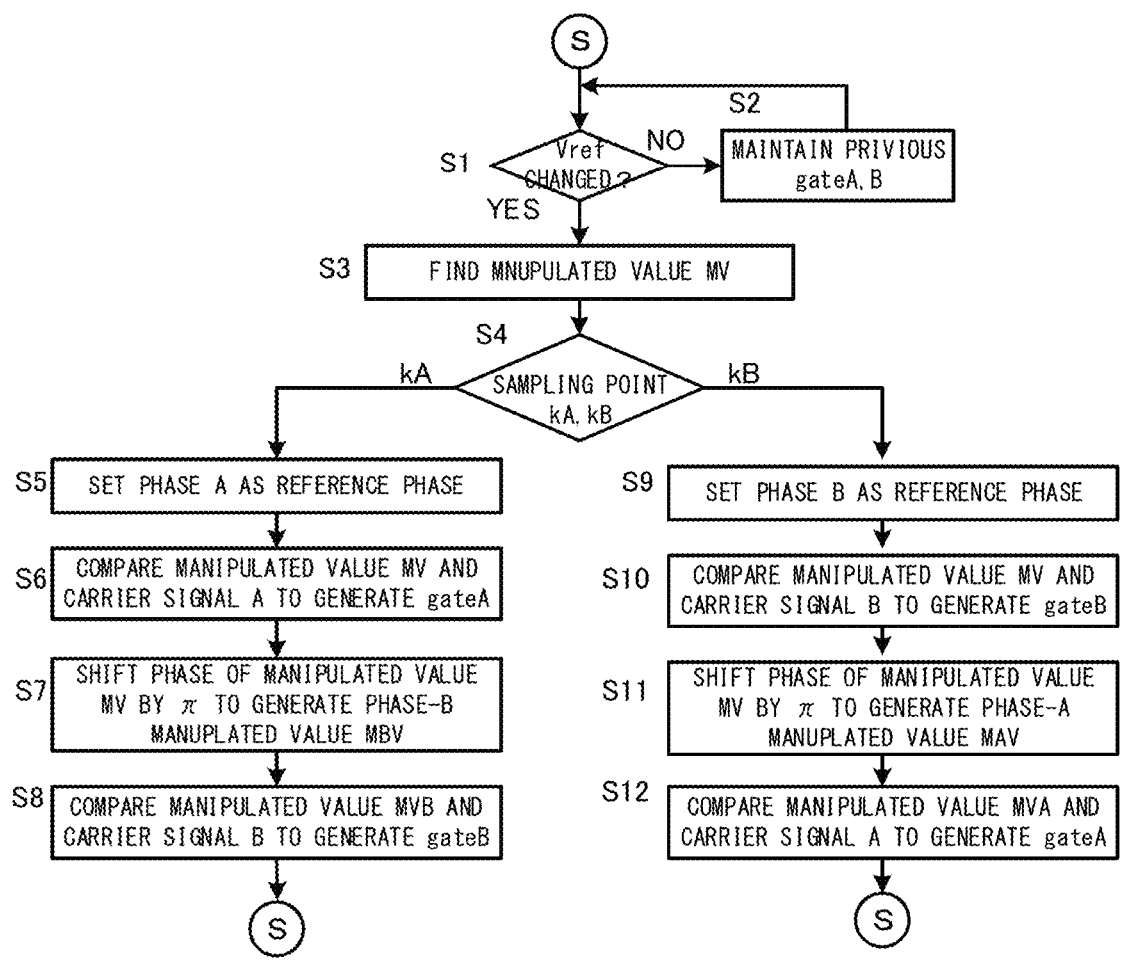
FIG. 6 is a flowchart for explaining the generation of gate signals by two-phase control in the power supply device of the present invention.

Next, the generation of gate signals in two-phase control will be described with reference to the flowchart in FIG. 6. The following description will be made using the sign "S".

When the command voltage Vref is changed (S1), a controller for power supply control finds the manipulated value MV by main control in which an output signal of a chopper section and the command voltage Vref are compared (S3). It should be noted that the gate signals (GateA and GateB) found last time are maintained (S2) until the command voltage Vref is changed.

Gate signals are generated at the first sampling point appearing after the command voltage Vref is changed (S4).

If sampling point kA of phase A appears after the command voltage Vref is changed (S4), phase A is set as the reference phase (S5), and the amplitude of the manipulated value MV and that of the carrier signal of phase A are compared to generate a gate signal GateA of phase A (S6). The manipulated value MV of phase A as the reference phase is phase-shifted by π (=2π/2) to generate a manipulated value MV-B of phase B (S7). The amplitude of the manipulated value MV-B generated and that of the carrier signal of phase B are compared to generate a gate signal GateB of phase B (S8).

If sampling point kB of phase B appears after the command voltage Vref is changed (S4), phase B is set as the reference phase (S9), and the amplitude of the manipulated value MV and that of the carrier signal of phase B are compared to generate the gate signal GateB of phase B (S10). The manipulated value MV of phase B as the reference phase is phase-shifted by $\pi$ ($=2\pi/2$) to generate a manipulated value MV-A of phase A (S11). The amplitude of the manipulated value MV-A generated and that of the carrier signal of phase A are compared to generate the gate signal GateA of phase A (S12).

Figure 7:
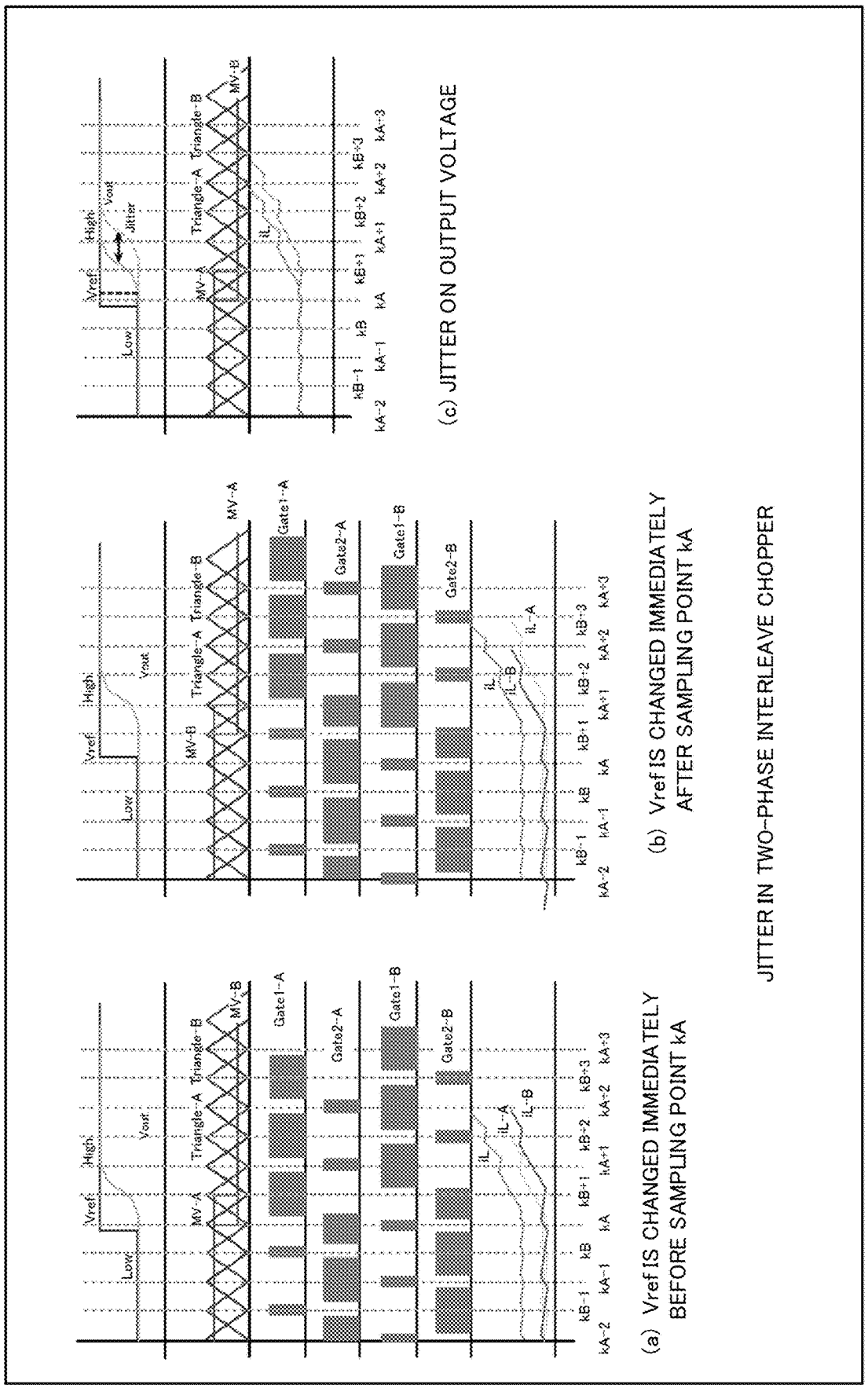
FIG. 7 is a diagram for explaining the generation of gate signals and jitter on output voltage by two-phase control in the power supply device of the present invention.

FIG. 7 illustrates the generation of gate signals in two-phase control and jitter on the output voltage. FIG. 7(a) illustrates the generation of gate signals for the case where the command voltage Vref is changed immediately before sampling point kA. FIG. 7(b) illustrates the generation of gate signals for the case where the command voltage Vref is changed immediately after sampling point kA. FIG. 7(c) illustrates jitter on the output voltage.

In FIG. 7(a), in the case where the command voltage Vref is changed immediately before sampling point kA, two-phase control is performed using phase A as the reference phase.

With regard to gate signals of phase A as the reference phase, the manipulated value MV is used as the manipulated value MV-A, and gate signals (Gate1-A and Gate2-A) are generated at sampling point kA by comparing the amplitude of the manipulated value MV-A and that of the carrier signal (Triangle-A). On the other hand, with regard to gate signals of phase B, gate signals (Gate1-B and Gate2-B) are generated at the next sampling point kB+1, by comparing the amplitude of the manipulated value MV-B, which is obtained by phase-shifting the manipulated value MV-A of phase A as the reference phase by $\pi$ ($=2\pi/2$), and that of the carrier signal (Triangle-B).

By driving the chopper circuit of phase A using the gate signals (Gate1-A and Gate2-A) of phase A, an inductance current iL-A is passed through the inductance LA. By driving the chopper circuit of phase B using the gate signals (Gate1-B and Gate2-B) of phase B, an inductance current iL-B is passed through the inductance LB. iL is a current obtained by summing the inductance current iL-A and the inductance current iL-B.

In FIG. 7(b), in the case where the command voltage Vref is changed immediately after sampling point kA, two-phase control is performed using phase B as the reference phase.

With regard to gate signals of phase B as the reference phase, the manipulated value MV is used as the manipulated value MV-B, and the gate signals (Gate1-B and Gate2-B) are generated at sampling point kB+1 by comparing the amplitude of the manipulated value MV-B and that of the carrier signal (Triangle-B). On the other hand, with regard to gate signals of phase A, the gate signals (Gate1-A and Gate2-A) are generated at the next sampling point kA+1, by comparing the amplitude of the manipulated value MV-A, which is obtained by phase-shifting the manipulated value MV-B by $\pi$ ($=2\pi/2$), and that of the carrier signal (Triangle-A).

By driving the chopper circuit of phase B using the gate signals (Gate1-B and Gate2-B) of phase B, the inductance current iL-B is passed through the inductance LB. By driving the chopper circuit of phase A using the gate signals (Gate1-A and Gate2-A) of phase A, the inductance current iL-A is passed through the inductance LA. iL is a current obtained by summing the inductance current iL-A and the inductance current iL-B.

FIG. 7(c) illustrates the output voltage and the inductance current iL (indicated by a solid line in the drawing) obtained in the state illustrated by FIG. 7(a) and the output voltage and the inductance current iL (indicated by a broken line in the drawing) obtained in the state illustrated by FIG. 7(b). The time difference between the two output voltages is denoted by jitter.

Jitter on the output voltage for the case where the command voltage is changed around sampling point kA is ½ of the period for single-phase control at most.

Embodiment for Three-Phase Control

Hereinafter, an embodiment in which three-phase control is performed will be described with reference to FIGS. 8 to 10.

Figure 8:
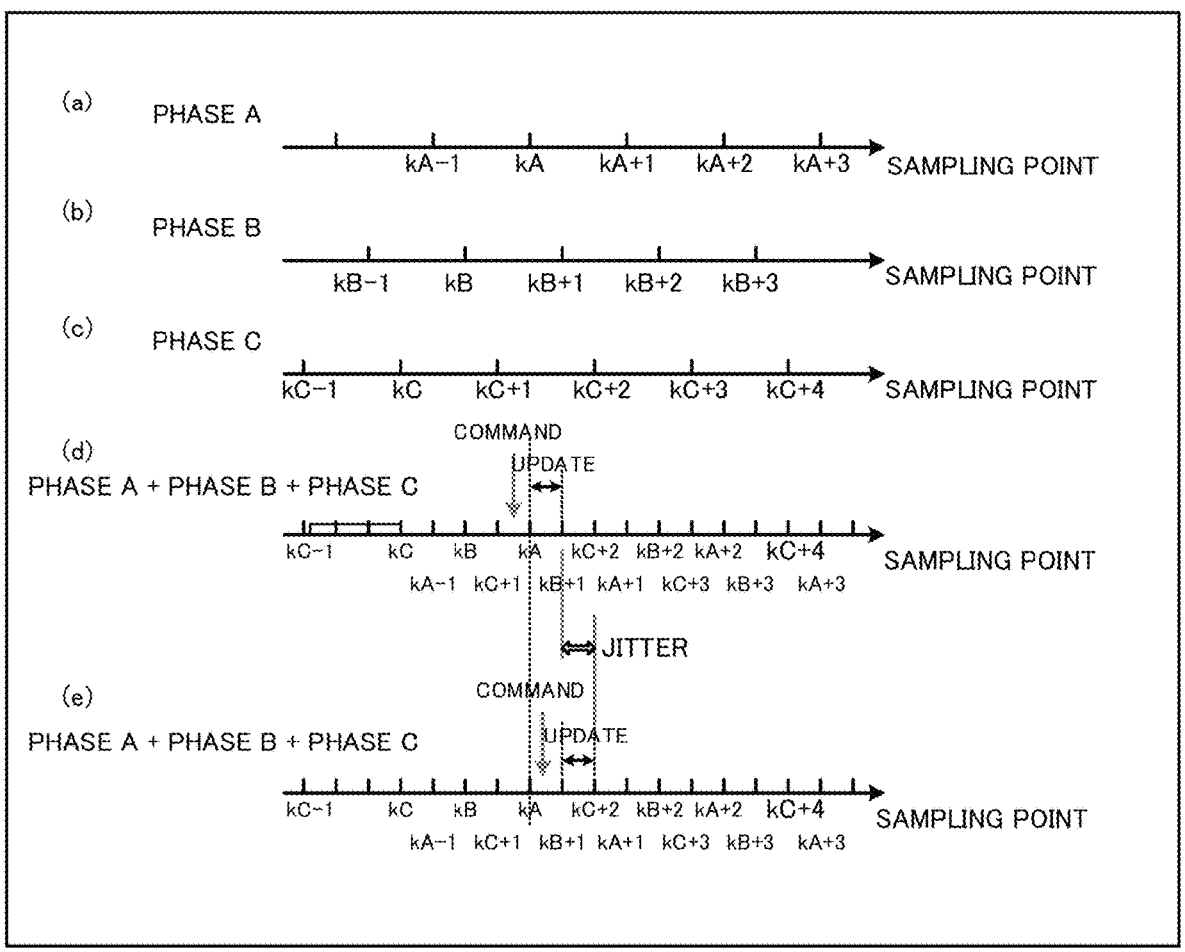
FIG. 8 is a diagram for explaining sampling points in three-phase control in the power supply device of the present invention.
Figure 9:
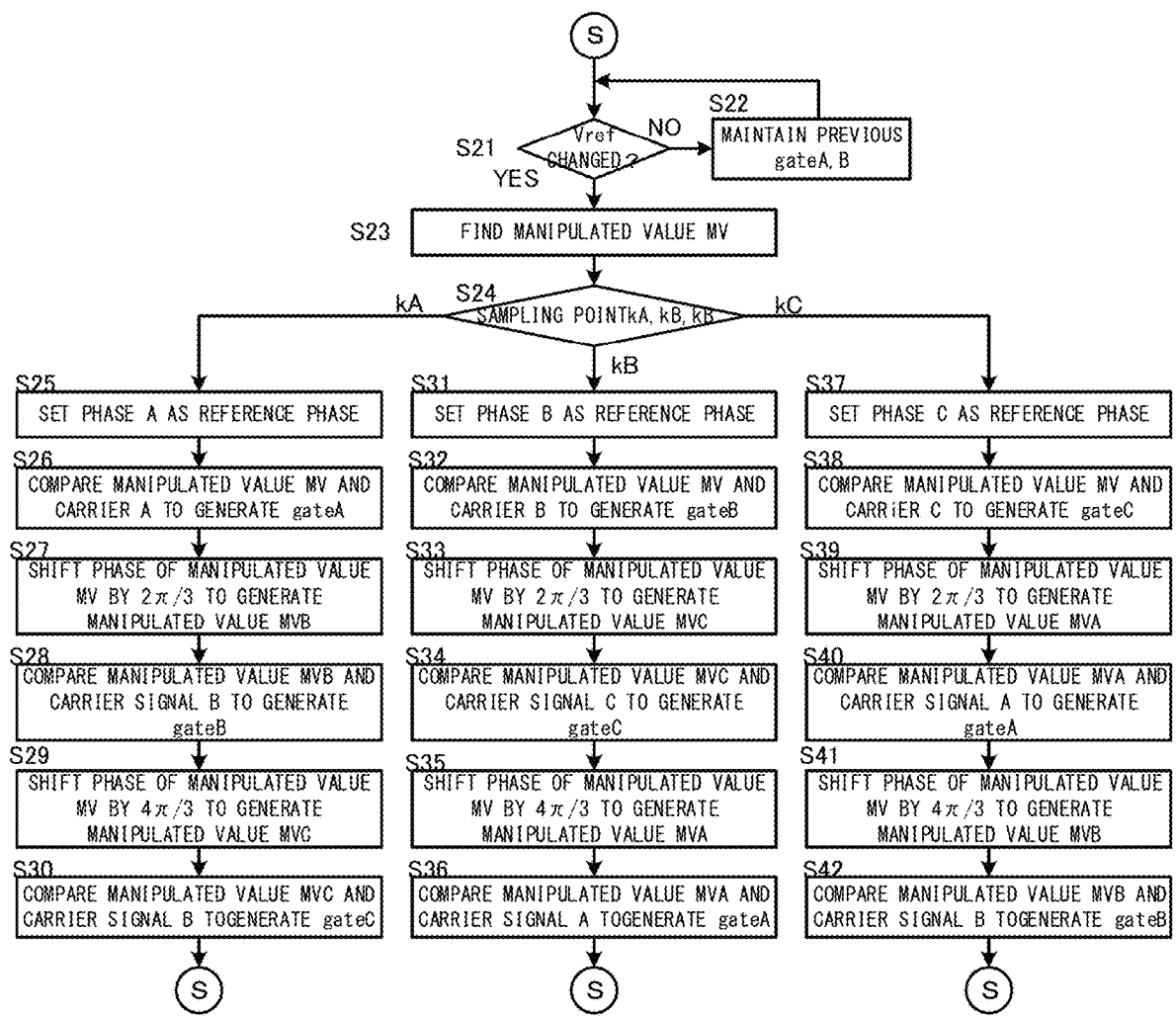
FIG. 9 is a flowchart for explaining the generation of gate signals by three-phase control in the power supply device of the present invention.

FIG. 8 illustrates sampling points of three-phase control. FIG. 8(a) illustrates sampling points (kA−1, kA, kA+1, kA+2, and kA+3) of phase A. FIG. 8(b) illustrates sampling points (kB−1, kB, kB+1, kB+2, and kB+3) of phase B. FIG. 8(c) illustrates sampling points (kC−1, kC, kC+1, kC+2, and kC+3) of phase C. The sampling points are points in time at which gate signals are generated. The sampling points of phase A, phase B, and phase C have the same period and phase shifts of $\pi$ ($=2\pi/3$) therebetween.

FIG. 8(d) and FIG. 8(e) illustrate superimposed sampling points of three phases, phase A, phase B, and phase C. By superimposing sampling points of three phases, the period of sampling points of three-phase control is reduced to ⅓ of the period of sampling points of each of phase A, phase B, and phase C.

By reducing the period of sampling points to ⅓, the width of the time delay between the point in time at which the command signal is changed and the point in time at which the gate signal is updated can be reduced. FIG. 8(d) illustrates a state in which the command is changed before sampling point kA, and FIG. 8(e) illustrates a state in which the command is changed after sampling point kA. In the case where the command is changed before sampling point kA, the gate signal is updated between sampling point kA and sampling point kB+1. In the case where the command is changed after sampling point kA, the gate signal is updated at a point in time delayed by ⅓ of the period of each phase between sampling point kB+1 and sampling point kC+2. Jitter results from the times of update of the above-described two gate signals, and the time width between the times of update of the two gate signals is ⅓ of the period of each phase at most. Accordingly, the amount of jitter is smaller than that in single-phase control.

Next, the generation of gate signals in three-phase control will be described with reference to the flowchart in FIG. 9. The following description will be made using the sign "S".

When the command voltage Vref is changed (S21), a controller for power supply control finds the manipulated value MV by main control in which an output signal of a chopper section and the command voltage Vref are compared (S23). It should be noted that the gate signals (GateA and GateB) found last time are maintained (S22) until the command voltage Vref is changed.

Gate signals are generated at the first sampling point appearing after the command voltage Vref is changed (S24).

If sampling point kA of phase A appears after the command voltage Vref is changed (S24) phase A is set as the reference phase (S25), and the amplitude of the manipulated value MV and that of the carrier signal of phase A are compared to generate the gate signal GateA of phase A (S26). The manipulated value MV of phase A as the reference phase is phase-shifted by $2\pi/3$ to generate the manipulated value MV-B of phase B (S27). The amplitude of the manipulated value MV-B generated and that of the carrier signal of phase B are compared to generate the gate signal GateB of phase B (S28). The manipulated value MV of phase A as the reference phase is phase-shifted by $4\pi/3$ ($=2\cdot(2\pi/3)$) to generate the manipulated value MV-C of phase C (S29). The amplitude of the manipulated value MV-C generated and that of the carrier signal of phase C are compared to generate a gate signal GateC of phase C (S30).

If sampling point kB of phase B appears after the command voltage Vref is changed (S24), phase B is set as the reference phase (S31), and the amplitude of the manipulated value MV and that of the carrier signal of phase B are compared to generate the gate signal GateB of phase B (S32). The manipulated value MV of phase B as the reference phase is phase-shifted by $2\pi/3$ to generate the manipulated value MV-C of phase C (S33). The amplitude of the manipulated value MV-C generated and that of the carrier signal of phase C are compared to generate the gate signal GateC of phase C (S34). The manipulated value MV of phase B as the reference phase is phase-shifted by $4\pi/3$ $(=2\cdot(2\pi/3))$ to generate the manipulated value MV-A of phase A (S35). The amplitude of the manipulated value MV-A generated and that of the carrier signal of phase A are compared to generate the gate signal GateA of phase A (S36).

If sampling point kC of phase C appears after the command voltage Vref is changed (S24), phase C is set as the reference phase (S37), and the amplitude of the manipulated value MV and that of the carrier signal of phase C are compared to generate the gate signal GateC of phase C (S38). The manipulated value MV of phase C as the reference phase is phase-shifted by $2\pi/3$ to generate the manipulated value MV-A of phase A (S39). The amplitude of the manipulated value MV-A generated and that of the carrier signal of phase A are compared to generate the gate signal GateA of phase A (S40). The manipulated value MV of phase C as the reference phase is phase-shifted by $4\pi/3$ $(=2\cdot(2\pi/3))$ to generate the manipulated value MV-B of phase B (S41). The amplitude of the manipulated value MV-B generated and that of the carrier signal of phase B are compared to generate the gate signal GateB of phase B (S42).

Figure 10:
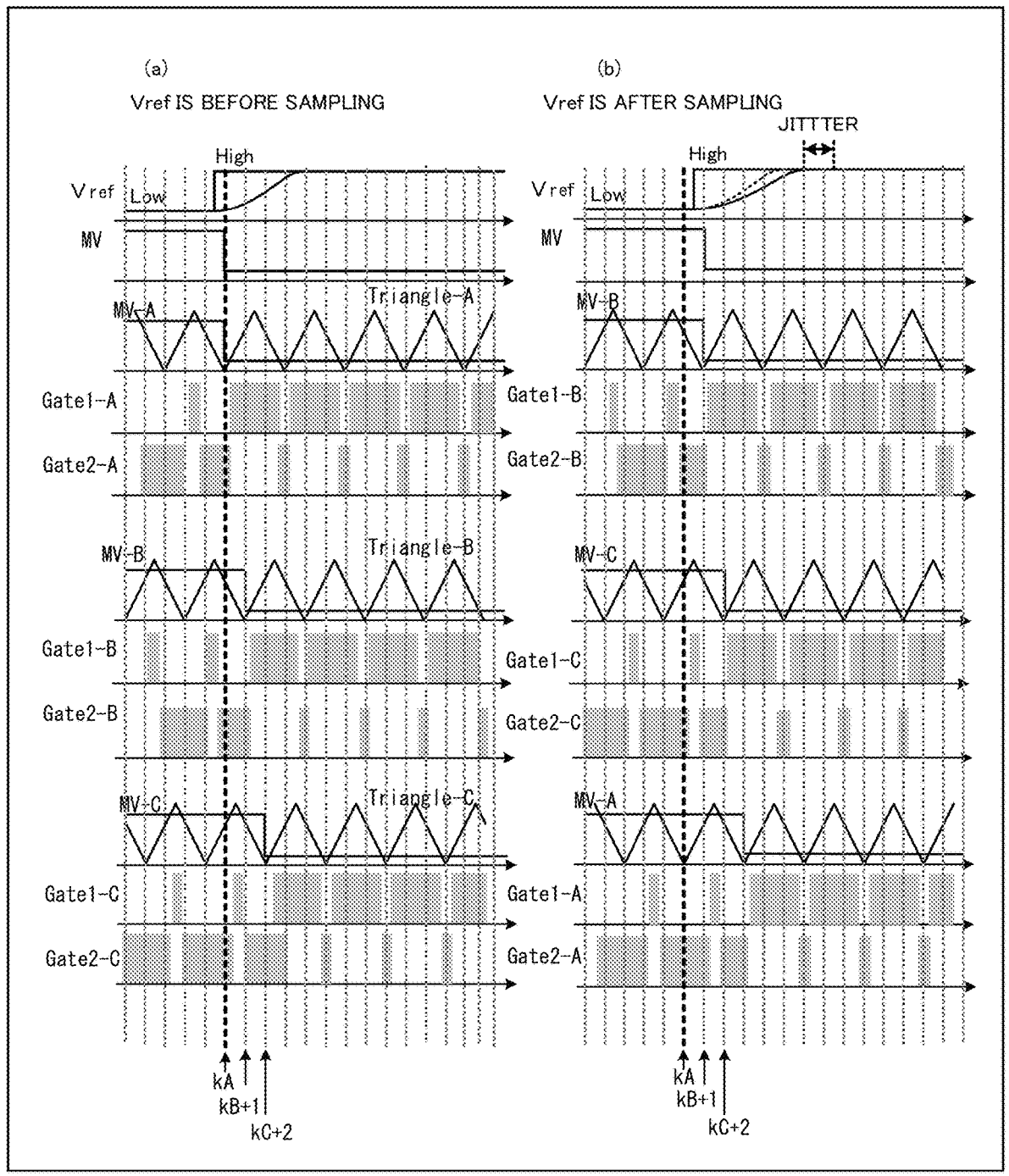
FIG. 10 is a diagram for explaining sampling points in three-phase control in the power supply device of the present invention.

FIG. 10 illustrates the generation of gate signals in three-phase control. FIG. 10(a) illustrates the generation of gate signals for the case where the command voltage Vref is changed immediately before sampling point kA. FIG. 10(b) illustrates the generation of gate signals for the case where the command voltage Vref is changed immediately after sampling point kA. It should be noted that FIG. 10 illustrates an example in which phase A is used as the reference phase.

In FIG. 10(a), in the case where the command voltage Vref is changed immediately before sampling point kA, three-phase control is performed using phase A as the reference phase.

With regard to gate signals of phase A as the reference phase, the manipulated value MV is used as the manipulated value MV-A, and the gate signals (Gate1-A and Gate2-A) are generated at sampling point kA by comparing the amplitude of the manipulated value MV-A and that of the carrier signal (Triangle-A). With regard to gate signals of phase B, the gate signals (Gate1-B and Gate2-B) are generated at the next sampling point kB+1, by comparing the amplitude of the manipulated value MV-B, which is obtained by phase-shifting the manipulated value MV-A of phase A as the reference phase by $2\pi/3$, and that of the carrier signal (Triangle-B). With regard to gate signals of phase C, the gate signals (Gate1-C and Gate2-C) are generated at the sampling point after the next kC+2, by comparing the manipulated value MV-C, which is obtained by phase-shifting the manipulated value MV-A of phase A as the reference phase by $4\pi/3$, and that of the carrier signal (Triangle-C).

In FIG. 10(b), in the case where the command voltage Vref is changed immediately after sampling point kA, three-phase control is performed using phase B as the reference phase.

With regard to gate signals of phase B as the reference phase, the manipulated value MV is used as the manipulated value MV-B, and the gate signals (Gate1-B and Gate2-B) are generated at sampling point kB+1 by comparing the amplitude of the manipulated value MV-B and that of the carrier signal (Triangle-B). With regard to gate signals of phase C, the gate signals (Gate1-C and Gate2-C) are generated at the next sampling point kC+2, by comparing the amplitude of the manipulated value MV-C, which is obtained by phase-shifting the manipulated value MV-B of phase B as the reference phase by $2\pi/3$, and that of the carrier signal (Triangle-C). With regard to gate signals of phase A, the gate signals (Gate1-A and Gate2-A) are generated at the sampling point after the next kC+2, by comparing the amplitude of the manipulated value MV-A, which is obtained by phase-shifting the manipulated value MV-B of phase B as the reference phase by $4\pi/3$, and that of the carrier signal (Triangle-A).

Figure 11:
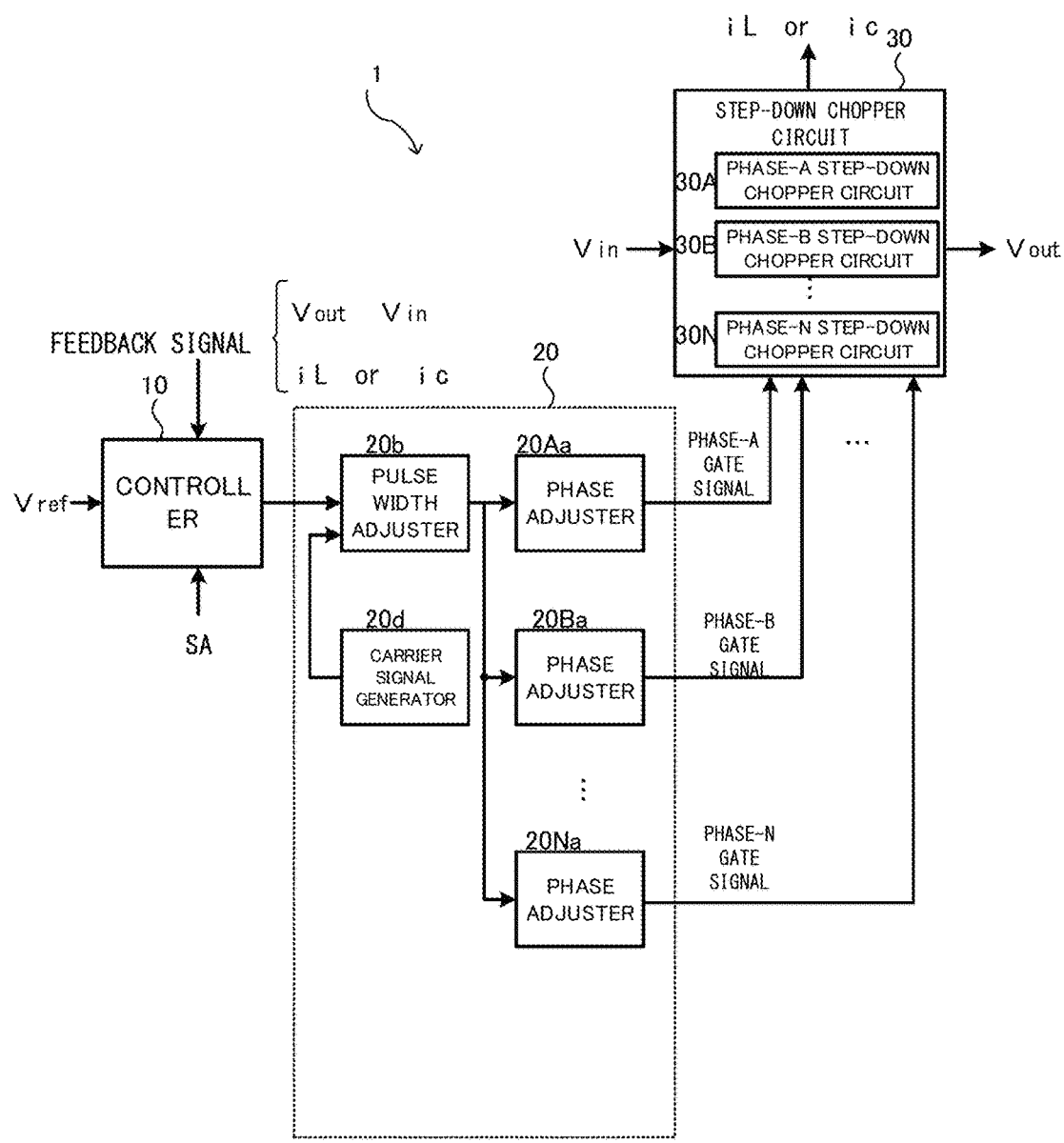
FIG. 11 is a diagram for explaining a schematic configuration example of a power supply device of a second embodiment of the present invention.
Figure 12:
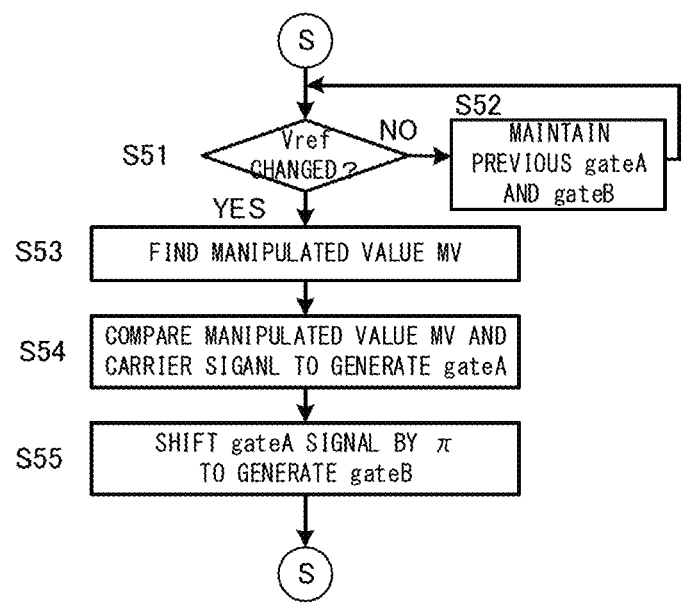
FIG. 12 is a flowchart for explaining the generation of gate signals in the second embodiment of the present invention.
Figure 13:
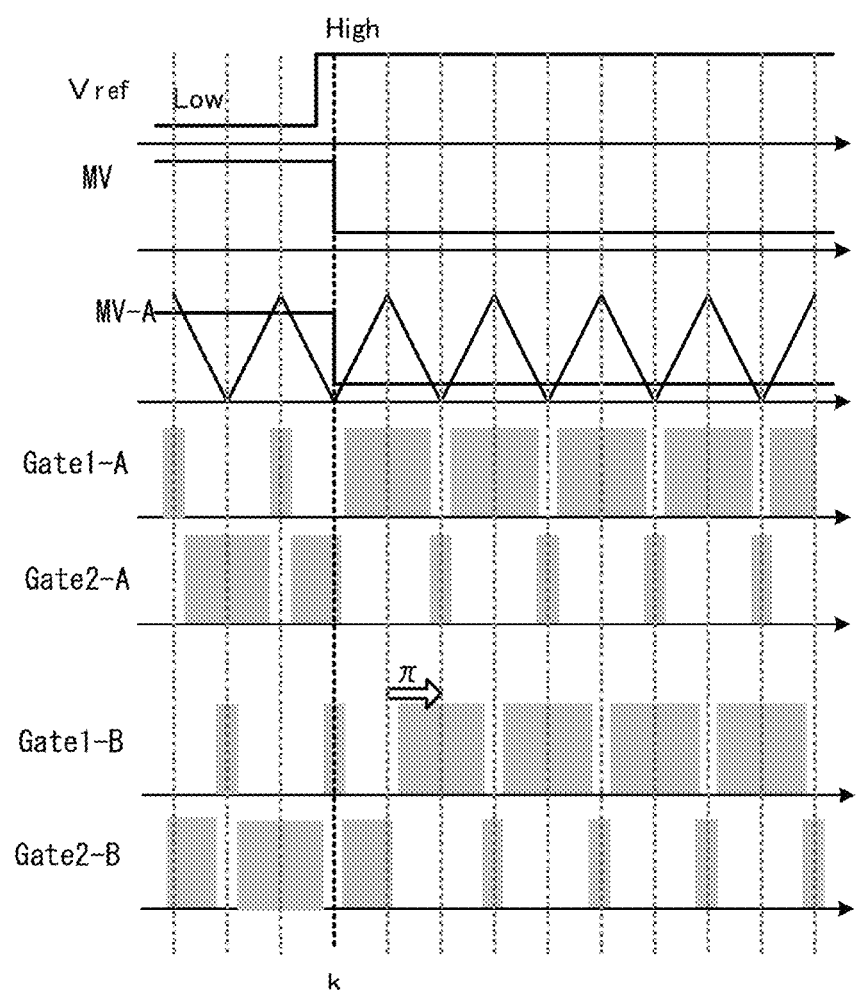
FIG. 13 is a diagram for explaining a timing diagram of a manipulated value and gate signals in the second embodiment of the present invention.
Figure 14:
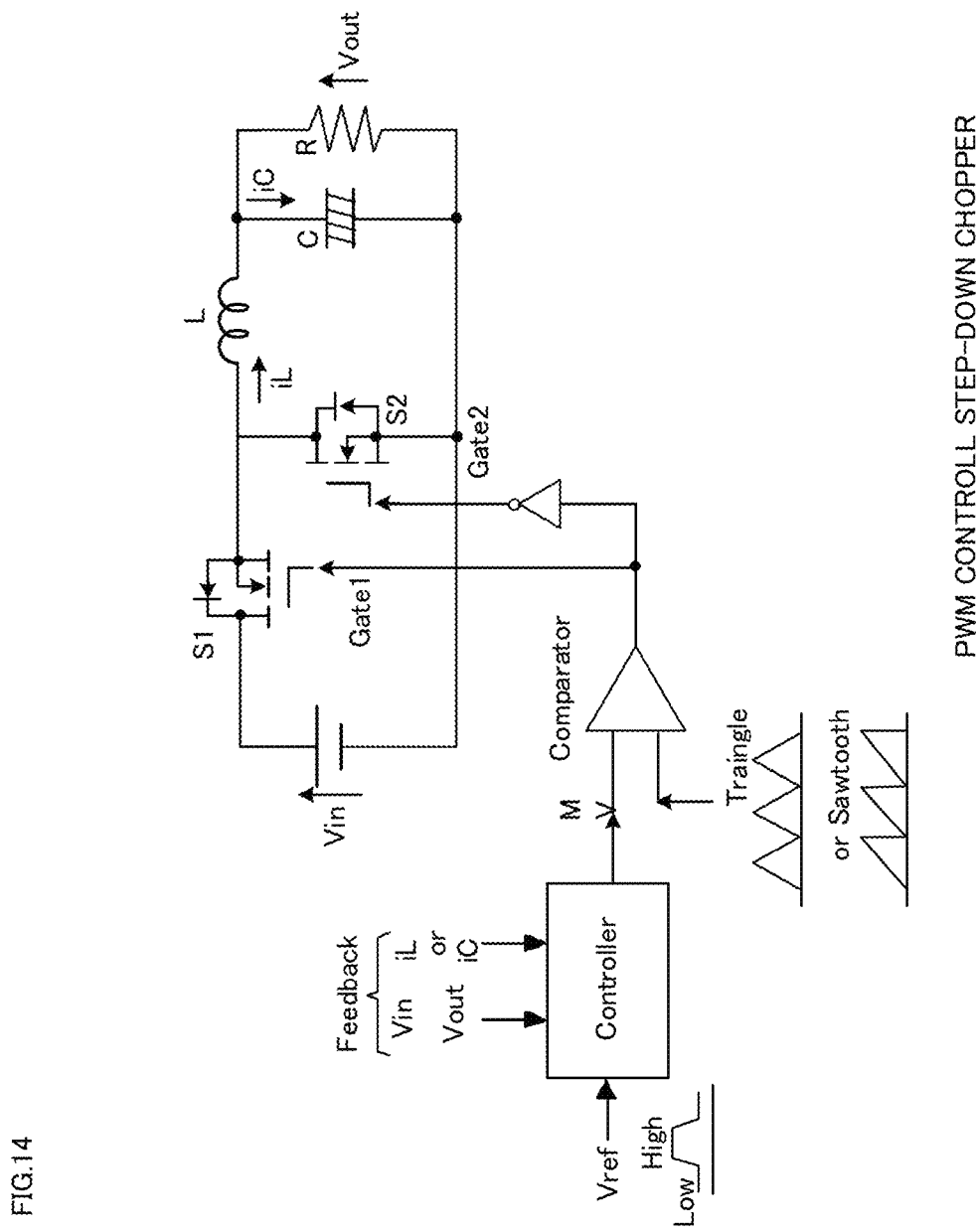
FIG. 14 is a diagram for explaining the circuit configuration of a step-down chopper circuit using a pulse width modulator (PWM controller).
Figure 15:
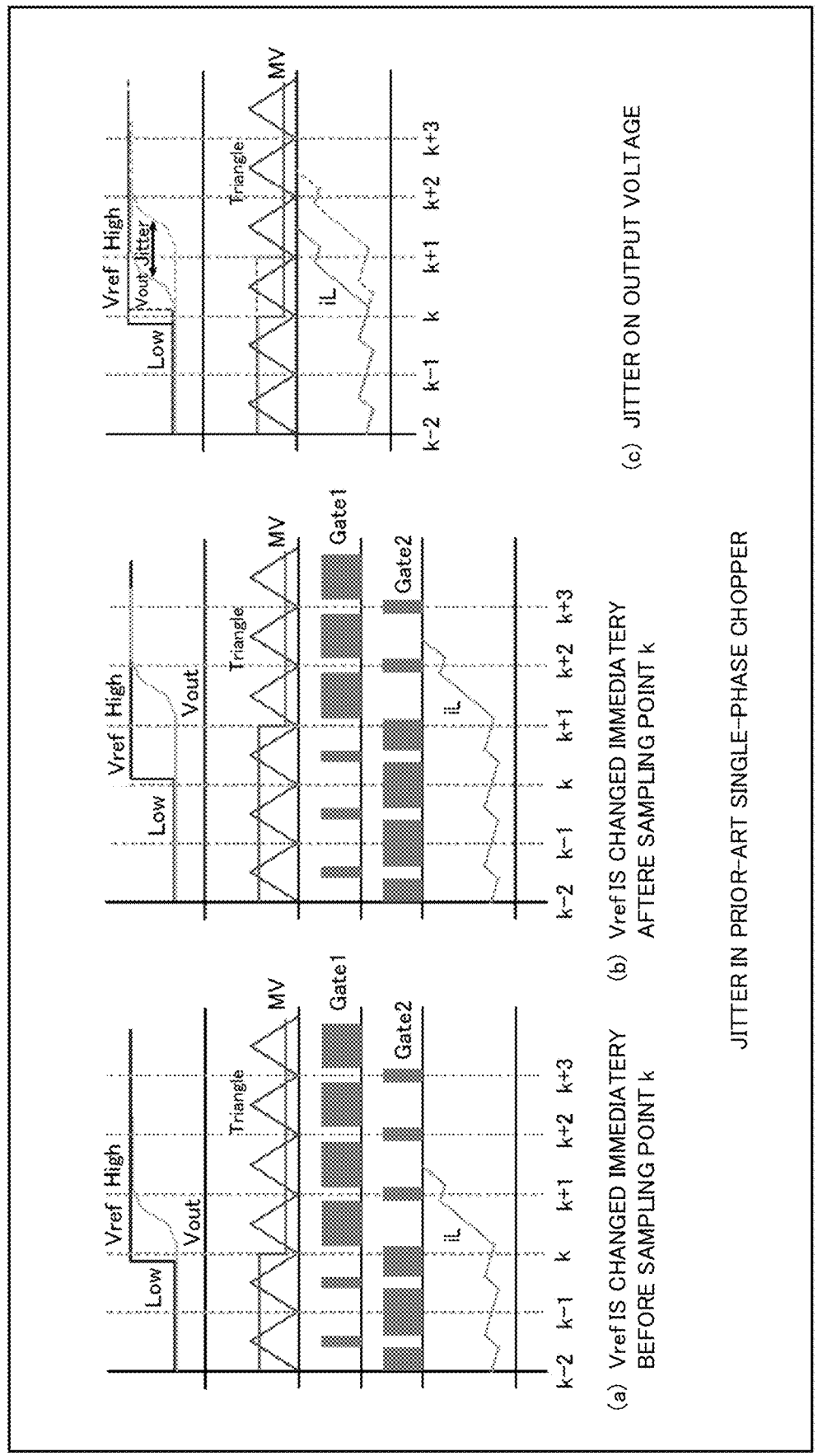
FIG. 15 is a diagram for explaining jitter occurring in a single-phase step-down chopper circuit.

Configuration Example of Second Power Supply Device and Embodiment of Control Method of the Present Invention Next, a second embodiment of the power supply device and the control method of the present invention will be described with reference to FIGS. 11 to 13. FIG. 11 illustrates a schematic configuration example of the power supply device of the second embodiment. FIG. 12 illustrates a flowchart of the second embodiment. FIG. 13 illustrates a timing diagram of a manipulated value and gate signals.

The second embodiment has a configuration in which in a gate signal generator, the phases of gate signals of the respective phases having pulse widths according to the manipulated value generated by a pulse width modulator are adjusted by phase adjusters.

The schematic configuration example illustrated in FIG. 11 represents a configuration example of the gate signal generator 20. Other part of the configuration is common to the schematic configuration example illustrated in FIG. 1. Accordingly, an explanation about the configuration example of the gate signal generator 20 will be made here, and an explanation about other part will be omitted.

In the gate signal generator 20 of the second embodiment, the pulse width modulator 20b generates a gate signal using the amplitude of the manipulated value MV of the controller 10 and that of the carrier signal generated by the carrier signal generator 20d to generate a gate signal. Phase adjusters 20Aa, 20Ba, ..., and 20Na stagger the phases of the gate signals generated by the pulse width modulator 20b by a phase difference obtained by dividing the sampling period by the number N of phases to generate gate signals (phase-A gate signal, phase-B gate signal, ..., and phase-N gate signal) of the respective phases.

The phase adjustment of gate signals by the phase adjusters 20Aa, 20Ba, ..., and 20Na is performed in accordance with phase shifts from the reference phase. For example, in the case where phase A is used as the reference phase, the phase adjuster 20Aa of phase A does not need to perform phase adjustment, and outputs the gate signal of the pulse width modulator 20b as the phase-A gate signal without performing phase adjustment.

On the other hand, in the case where phase A is used as the reference phase, the phase adjuster 20Ba of phase B adjusts the phase of the gate signal of the pulse width modulator 20b by a phase difference of 2π/N and outputs the phase-adjusted gate signal as the phase-B gate signal, the phase adjuster 20Ca of phase C adjusts the phase of the gate signal of the pulse width modulator 20b by a phase difference of 2√(2π/N) and outputs the phase-adjusted gate signal as the phase-C gate signal, and the phase adjuster 20Na of phase N adjusts the phase of the gate signal of the pulse width modulator 20b by a phase difference of (N−1)·(2π/N) and outputs the phase-adjusted gate signal as the phase-N gate signal.

The gate signal generator 20 of the second embodiment has a configuration in which the phase of the gate signal obtained by comparing the manipulated value MV and the carrier signal in the pulse width modulator 20b is adjusted for the respective phases by the phase adjusters 20Aa to 20Na. Accordingly, the phase shifter provided in the first embodiment to match the phase of the manipulated value and that of the carrier signal is unnecessary.

Next, the generation of gate signals in the second embodiment will be described with reference to the flowchart in FIG. 12 by taking the case of two-phase control as an example. The following description will be made using the sign "S".

When the command voltage Vref is changed (S51), a controller for power supply control finds the manipulated value MV (S53) by main control in which an output signal of a chopper section and the command voltage Vref are compared. It should be noted that the gate signals (GateA and GateB) found last time are maintained (S52) until the command voltage Vref is changed.

Gate signals are generated at the first sampling point appearing after the command voltage Vref is changed. If the first sampling point is a sampling point of phase A, the chopper circuit of phase A is controlled using the generated gate signal as the gate signal GateA of phase A. On the other hand, if the first sampling point is a sampling point of phase B, the chopper circuit of phase B is controlled using the generated gate signal as the gate signal GateB of phase B (S54).

Next, the generated gate signal is shifted by π to generate a gate signal of the other phase at the next sampling point.

If the first sampling point is a sampling point of phase A, the phase of the gate signal generated previously is adjusted by π, and the chopper circuit of phase B is controlled using the phase-adjusted gate signal as the gate signal GateB. On the other hand, if the first sampling point is a sampling point of phase B, the phase of the gate signal generated previously is adjusted by π, and the chopper circuit of phase A is controlled using the phase-adjusted gate signal as the gate signal GateA (S55).

FIG. 13 illustrates the generation of gate signals in two-phase control in the second embodiment. FIG. 13 illustrates the generation of gate signals for the case where the command voltage Vref is changed immediately before sampling point kA.

In FIG. 13, in the case where the command voltage Vref is changed immediately before sampling point kA, two-phase control is performed using phase A as the reference phase.

With regard to gate signals of phase A as the reference phase, the gate signals (Gate1-A and Gate2-A) are generated at sampling point k by comparing the amplitude of the manipulated value MV and that of the carrier signal. On the other hand, with regard to gate signals of phase B, the phase-B gate signals (Gate1-B and Gate2-B) are generated by shifting the phases of the phase-A gate signals (Gate1-A and Gate2-A) by π.

The chopper circuit of phase A is driven using the gate signals (Gate1-A and Gate2-A) of phase A, and the chopper circuit of phase B is driven using the gate signals (Gate1-B and Gate2-B) of phase B.

According to the first and second embodiments of the present invention, jitter on the output voltage can be reduced in accordance with the number of phases by performing High/Low pulse control in the power supply device.

For example, the time width Jitter of jitter can be represented by the following arithmetic equation:

$$\text{Jitter}=(1/\text{fsw})\times(1/N)$$

where fsw is the switching frequency and N is the number of phases.

According to the first and second embodiments of the present invention, even if the switching frequencies with which chopper circuits are driven cannot be increased due to limitations such as losses in switching elements, the time width of jitter on the output voltage can be greatly reduced by increasing the number N of phases of chopper circuits.

For example, even if switching elements such as low-frequency IGBTs having a switching frequency fsw of approximately 20 kHz are used, a time width of jitter of 100 ns can be realized with 500 (=(1/20 kHz)/100 ns) phases based on the equation N=(1/fsw)/Jitter.

It should be noted that the above-described descriptions in the embodiments and the modified examples are examples of the power supply device according to the present invention. The present invention is not limited to the embodiments, and various modifications can be made to the embodiments based on the spirit of the present invention. These modifications are not excluded from the scope of the present invention.

INDUSTRIAL APPLICABILITY

The power supply device of the present invention can be applied to the supply of high-frequency power to an apparatus using high frequency such as an apparatus for manufacturing a semiconductor, a liquid crystal panel, or the like, a vacuum deposition apparatus, or a heating and melting apparatus.

DESCRIPTION OF REFERENCE NUMERALS 1 power supply device
10 controller
20 gate signal generator
20A phase-A gate signal generator
20Aa phase adjuster
20Ab-20Nb pulse width modulator
20Ac-20Nc phase shifter
20B phase-B gate signal generator
20Ba phase adjuster
20Bb pulse width modulator
20Ca phase adjuster
20N phase-N gate signal generator
20a phase adjuster
20b pulse width modulator
20c phase shifter
20d carrier signal generator
30 chopper section
30A-30N step-down chopper circuit
Gate1 gate signal Gate2 gate signal
GateA gate signal
GateB gate signal
GateC gate signal
iC capacitor current
iL inductance current
iL-A inductance current
iL-B inductance current
Jitter time width
k sampling point
kA sampling point
kB sampling point
kC sampling point
LA inductance
LB inductance
MV manipulated value
MV-A manipulated value
MY-B manipulated value
MV-C manipulated value
S1, S2 switching element
S1A switching element
S1B switching element
S2A switching element
S2B switching element
Vout output voltage
Vref command voltage

What is claimed is:

1. A power supply device having variable output voltage, the power supply device comprising:
a multiphase chopper section including step-down chopper circuits of a plurality of phases connected in parallel;
a controller for calculating a manipulated value for controlling the chopper section from a feedback signal outputted from the chopper section and a command signal; and
a gate signal generator for generating gate signals for performing multiphase control of turning on/off of switching elements included in the step-down chopper circuits of the respective phases based on the manipulated value in phases displaced from each other, wherein
the number of phases of the gate signals equals the number of phases of the step-down chopper circuits, and
in the gate signal generator,
gate signals are generated with the same sampling period for the respective phases by sampling synchronous with generation of the gate signals and asynchronous to the command signal, and
sampling points at which the gate signals are generated are sampling points after a point in time at which the controller calculates the manipulated value.

2. The power supply device according to claim 1, wherein the gate signal generator includes
a pulse width modulator for generating gate signals having pulse widths according to the manipulated value for the respective phases, and
a phase adjuster for performing phase adjustment in which phases of the gate signals of the respective phases are staggered by a phase difference obtained by dividing the sampling period by the number of phases.

3. The power supply device according to claim 2, wherein the gate signal generator has a configuration in which the pulse width modulator generates the gate signals of the respective phases having the pulse widths according to the manipulated value using carrier signals of the respective phases phase-adjusted by the phase adjuster,
the gate signal generator includes a phase shifter for phase-shifting the manipulated value by a phase difference obtained by dividing the sampling period by the number of phases for each phase in order,
the phase adjuster generates carrier signals for the respective phases with phases displaced from each other by a phase difference obtained by dividing the sampling period by the number of phases, and
the pulse width modulator generates the gate signals based on amplitude comparison between the manipulated value and the carrier signals of the respective phases.

4. The power supply device according to claim 2, wherein the gate signal generator has a configuration in which the phase adjuster adjusts phases of the gate signals of the respective phases having the pulse widths according to the manipulated value generated by the pulse width modulator,
the pulse width modulator generates a gate signal based on comparison between the manipulated value and the carrier signals, and
the phase adjuster staggers the phases of the gate signals generated by the pulse width modulator by a phase difference obtained by dividing the sampling period by the number of phases to generate the gate signals of the respective phases.

5. A method for controlling a power supply device, the method capable of changing output voltage based on a command signal by feedback control of a multiphase chopper section including a plurality of step-down chopper circuits connected in parallel, the method comprising:
a gate signal generation step for generating gate signals for performing multiphase control of turning on/off of switching elements included in the step-down chopper circuits of the respective phases based on a manipulated value of the feedback control in phases displaced from each other, by sampling performed with the same sampling period for the respective phases, wherein
the gate signal generation step includes
a pulse width modulation step for generating gate signals having pulse widths according to the manipulated value for the respective phases, and
a phase adjustment step for performing phase adjustment in which phases of the gate signals of the respective phases are staggered by a phase difference obtained by dividing the sampling period by the number of phases, and
the sampling is synchronous with generation of the gate signals and asynchronous to the command signal.

6. The method for controlling power supply device according to claim 5, wherein
the gate signal generation step is the step of generating the gate signals of the respective phases having the pulse widths according to the manipulated value by the pulse width modulation step using carrier signals of the respective phases phase-adjusted in the phase adjustment step,
the gate signal generation step includes a phase shift step for phase-shifting the manipulated value by a phase difference obtained by dividing the sampling period by the number of phases for each phase in order,
the phase adjustment step generates carrier signals for the respective phases with phases displaced from each other by a phase difference obtained by dividing the sampling period by the number of phases, and the pulse width modulation step generates the gate signals based on amplitude comparison between the manipulated value and the carrier signals of the respective phases.

7. The method for controlling power supply device according to claim 5, wherein the gate signal generation step is the step of adjusting, by the phase adjustment step, phases of the gate signals of the respective phases having the pulse widths according to the manipulated value generated in the pulse width modulation step, and the pulse width modulation step generates the gate signals of the respective phases based on comparison between the manipulated values of the respective phases and the same carrier signal, and the phase adjustment step staggers the phases of the gate signals of the respective phases generated in the pulse width modulation step by a phase difference obtained by dividing the sampling period by the number of phases.

* * * * *